United States Patent
Khoche

(10) Patent No.: US 11,328,201 B2
(45) Date of Patent: May 10, 2022

(54) ROLL-TO-ROLL METHOD OF FABRICATING A WIRELESS MULTI-LAYER LAMINATE

(71) Applicant: Trackonomy Systems, Inc., Santa Clara, CA (US)

(72) Inventor: Ajay Khoche, West San Jose, CA (US)

(*) Notice: Subject to any disclaimer, the term of this patent is extended or adjusted under 35 U.S.C. 154(b) by 0 days.

(21) Appl. No.: 16/581,599

(22) Filed: Sep. 24, 2019

(65) Prior Publication Data

US 2020/0019833 A1 Jan. 16, 2020

Related U.S. Application Data

(63) Continuation of application No. 15/842,867, filed on Dec. 14, 2017, now Pat. No. 10,445,634.
(Continued)

(51) Int. Cl.
*G06K 19/077* (2006.01)
*G06K 19/06* (2006.01)
(Continued)

(52) U.S. Cl.
CPC ........ *G06K 19/07773* (2013.01); *B32B 37/06* (2013.01); *B32B 37/12* (2013.01);
(Continued)

(58) Field of Classification Search
CPC ....... G06K 19/07773; G06K 19/06037; G06K 19/0702; H04W 4/029; H04W 4/027;
(Continued)

(56) References Cited

U.S. PATENT DOCUMENTS

| | | | |
|---|---|---|---|
| 5,478,991 A | 12/1995 | Watanabe et al. |
| 5,495,250 A | 2/1996 | Ghaem et al. |
| 5,499,717 A | 3/1996 | Hayashi |
| 5,838,253 A | 11/1998 | Wurz et al. |

(Continued)

FOREIGN PATENT DOCUMENTS

| EP | 1786143 | 5/2007 |
|---|---|---|
| JP | 2008239282 A | 10/2008 |

(Continued)

OTHER PUBLICATIONS

A Dementyev, H.-L. C. Kao, J. Paradiso, "SensorTape: Modular and Programmable 3D-Aware Dense Sensor Network on a Tape", In Proc. of UIST 2015.

(Continued)

*Primary Examiner* — Jacob T Minskey
*Assistant Examiner* — S. Behrooz Ghorishi

(57) ABSTRACT

A low-cost, multi-function tracking system with a form factor that unobtrusively integrates the components needed to implement a combination of different localization techniques and also is able to perform a useful ancillary function that otherwise would have to be performed with the attendant need for additional materials, labor, and expense. An example tracking system is implemented as an adhesive product that integrates tracking components within a flexible adhesive structure in a way that not only provides a cost-effective platform for interconnecting, optimizing, and protecting the components of the tracking system but also maintains the flexibility needed to function as an adhesive product that can be deployed seamlessly and unobtrusively into various tracking applications and workflows, including person and object tracking applications, and asset management workflows such as manufacturing, storage, shipping, (Continued)

delivery, and other logistics associated with moving products and other physical objects.

19 Claims, 10 Drawing Sheets

Related U.S. Application Data

(60) Provisional application No. 62/434,218, filed on Dec. 14, 2016, provisional application No. 62/435,207, filed on Dec. 16, 2016.

(51) Int. Cl.
| | |
|---|---|
| *G06K 19/07* | (2006.01) |
| *H04W 4/029* | (2018.01) |
| *C09J 7/38* | (2018.01) |
| *B32B 37/06* | (2006.01) |
| *B32B 37/12* | (2006.01) |
| *H04W 4/02* | (2018.01) |

(52) U.S. Cl.
CPC .......... *C09J 7/38* (2018.01); *G06K 19/06037* (2013.01); *G06K 19/0702* (2013.01); *H04W 4/029* (2018.02); *B32B 2457/00* (2013.01); *C09J 2203/326* (2013.01); *C09J 2301/124* (2020.08); *C09J 2301/302* (2020.08); *C09J 2301/40* (2020.08); *C09J 2463/00* (2013.01); *H04W 4/027* (2013.01)

(58) Field of Classification Search
CPC .... C09J 7/38; C09J 2301/40; C09J 2301/124; C09J 2301/302; C09J 2203/326; C09J 2463/00; B32B 37/06; B32B 37/12; B32B 2457/00
See application file for complete search history.

(56) References Cited

U.S. PATENT DOCUMENTS

| | | | |
|---|---|---|---|
| 6,372,342 B1 | 4/2002 | Karaoglu | |
| 6,375,780 B1* | 4/2002 | Tuttle | .................... G01S 13/758 156/226 |
| 6,404,341 B1 | 6/2002 | Reid | |
| 6,614,392 B2 | 9/2003 | Howard | |
| 7,020,701 B1 | 3/2006 | Gelvin et al. | |
| 7,048,194 B2 | 5/2006 | Minami et al. | |
| 7,177,054 B2 | 2/2007 | Silverbrook et al. | |
| 7,259,030 B2 | 8/2007 | Daniels et al. | |
| 7,299,990 B2 | 11/2007 | Hoshina | |
| 7,321,167 B2 | 1/2008 | Zhong et al. | |
| 7,405,656 B2 | 7/2008 | Olsen | |
| 7,511,616 B2 | 3/2009 | Lake | |
| 7,540,603 B2 | 6/2009 | Otsuki | |
| 7,722,249 B2 | 5/2010 | Kim et al. | |
| 7,723,733 B2 | 5/2010 | Daniels et al. | |
| 7,838,844 B2 | 11/2010 | Wagner et al. | |
| 7,884,727 B2 | 2/2011 | Tran | |
| 8,062,735 B2 | 11/2011 | Bi et al. | |
| 8,072,620 B2 | 12/2011 | Yamamoto et al. | |
| 8,110,254 B1 | 2/2012 | Sharma et al. | |
| 8,114,248 B2 | 2/2012 | Lee et al. | |
| 8,269,633 B2 | 9/2012 | Hollander et al. | |
| 8,292,173 B2 | 10/2012 | Yturralde et al. | |
| 8,401,238 B2 | 3/2013 | Stahlin et al. | |
| 8,448,530 B2 | 5/2013 | Leuenberger et al. | |
| 8,658,455 B2 | 2/2014 | Shin et al. | |
| 8,716,629 B2 | 5/2014 | Klewer et al. | |
| 8,786,510 B2 | 7/2014 | Coleman et al. | |
| 8,833,664 B2 | 9/2014 | Choi | |
| 8,879,276 B2 | 11/2014 | Wang | |
| 8,971,673 B2 | 3/2015 | Beinhocker | |
| 9,070,286 B2 | 6/2015 | Moore | |
| 9,137,637 B2 | 9/2015 | Bilal et al. | |
| 9,159,635 B2 | 10/2015 | Elolampi et al. | |
| 9,182,231 B2 | 11/2015 | Skaaksrud | |
| 9,183,738 B1 | 11/2015 | Allen, Sr. et al. | |
| 9,250,104 B2 | 2/2016 | Greiner et al. | |
| 9,307,648 B2 | 4/2016 | Slafer | |
| 9,372,123 B2 | 6/2016 | Li et al. | |
| 9,419,502 B2 | 8/2016 | Veronesi et al. | |
| 9,473,902 B2 | 10/2016 | Bilal et al. | |
| 9,496,582 B1 | 11/2016 | Lim et al. | |
| 9,543,495 B2 | 1/2017 | Paschkewitz et al. | |
| 9,543,549 B2 | 1/2017 | Bai et al. | |
| 9,583,428 B2 | 2/2017 | Rafferty et al. | |
| 9,632,050 B2 | 4/2017 | Zhong et al. | |
| 9,643,460 B2 | 5/2017 | Peine et al. | |
| 9,693,689 B2 | 7/2017 | Gannon et al. | |
| 9,753,568 B2 | 9/2017 | McMillen | |
| 9,781,825 B2 | 10/2017 | Farkas et al. | |
| 9,860,688 B2 | 1/2018 | Kulkarni et al. | |
| 9,886,015 B2 | 2/2018 | Wilson et al. | |
| 10,262,255 B2 | 4/2019 | Khoche | |
| 10,357,924 B2 | 7/2019 | Waldrop, III et al. | |
| 10,445,634 B2 | 10/2019 | Khoche | |
| 10,872,286 B2 | 12/2020 | Khoche | |
| 10,885,420 B2 | 1/2021 | Khoche | |
| 2003/0000128 A1 | 1/2003 | Wood et al. | |
| 2004/0044493 A1 | 3/2004 | Coulthard | |
| 2004/0131761 A1* | 7/2004 | Shakespeare | ........ G06K 19/077 427/58 |
| 2005/0211998 A1 | 9/2005 | Daniels et al. | |
| 2006/0100299 A1 | 5/2006 | Malik et al. | |
| 2006/0248713 A1 | 11/2006 | Vatanparast et al. | |
| 2007/0049291 A1 | 3/2007 | Kim et al. | |
| 2007/0287473 A1 | 8/2007 | Dupray | |
| 2008/0198002 A1 | 8/2008 | Bartholf et al. | |
| 2009/0051530 A1 | 2/2009 | Brooks et al. | |
| 2009/0072974 A1 | 3/2009 | Miyashita et al. | |
| 2009/0174600 A1 | 7/2009 | Mazlum et al. | |
| 2009/0192709 A1 | 7/2009 | Yonker et al. | |
| 2009/0196267 A1 | 8/2009 | Walker, Sr. | |
| 2010/0096181 A1 | 4/2010 | Nakamura et al. | |
| 2010/0180701 A1 | 7/2010 | Daniel et al. | |
| 2010/0230498 A1 | 9/2010 | Atherton | |
| 2011/0202159 A1* | 8/2011 | Wang | ................... H01M 4/139 700/98 |
| 2011/0218756 A1 | 9/2011 | Callsen et al. | |
| 2011/0251469 A1 | 10/2011 | Varadan | |
| 2012/0234586 A1 | 9/2012 | Telle et al. | |
| 2012/0271540 A1 | 10/2012 | Miksa et al. | |
| 2012/0278676 A1 | 11/2012 | Teraura | |
| 2013/0131980 A1 | 5/2013 | Ginsberg | |
| 2013/0250357 A1 | 9/2013 | Yu | |
| 2014/0014403 A1 | 1/2014 | Miller et al. | |
| 2014/0240088 A1 | 8/2014 | Robinette et al. | |
| 2014/0265915 A1 | 9/2014 | Huang et al. | |
| 2014/0268780 A1 | 9/2014 | Wang et al. | |
| 2014/0274139 A1 | 9/2014 | Bilal et al. | |
| 2014/0317406 A1 | 10/2014 | Lewis et al. | |
| 2014/0362890 A1 | 12/2014 | Qian | |
| 2015/0324745 A1 | 11/2015 | Goodall et al. | |
| 2015/0349667 A1 | 12/2015 | Andosca et al. | |
| 2015/0354973 A1 | 12/2015 | Wang et al. | |
| 2015/0382154 A1 | 12/2015 | Bilal et al. | |
| 2016/0011074 A1 | 1/2016 | Mian et al. | |
| 2016/0026213 A1 | 1/2016 | Li et al. | |
| 2016/0147353 A1 | 5/2016 | Filiz et al. | |
| 2016/0205509 A1 | 7/2016 | Hopcraft et al. | |
| 2016/0270215 A1 | 9/2016 | Goto | |
| 2016/0322283 A1 | 11/2016 | McMahon et al. | |
| 2016/0370210 A1 | 12/2016 | Kapusta et al. | |
| 2016/0377440 A1 | 12/2016 | Dorum | |
| 2017/0017872 A1 | 1/2017 | Kato et al. | |
| 2017/0025547 A1 | 1/2017 | Cho et al. | |
| 2017/0079144 A1 | 3/2017 | Coleman et al. | |
| 2017/0161679 A1 | 6/2017 | Stingel et al. | |
| 2017/0337405 A1 | 11/2017 | Schütz | |
| 2018/0003507 A1 | 1/2018 | Arslan et al. | |
| 2018/0104609 A1 | 4/2018 | Musliner | |

(56) References Cited

U.S. PATENT DOCUMENTS

| | | |
|---|---|---|
| 2018/0110450 A1 | 4/2018 | Lamego et al. |
| 2018/0326487 A1 | 11/2018 | Casper et al. |
| 2019/0272458 A1 | 9/2019 | Khoche |

FOREIGN PATENT DOCUMENTS

| | | |
|---|---|---|
| JP | 2009230500 | 10/2009 |
| JP | 2011090670 | 5/2011 |
| JP | 2012141995 | 7/2012 |
| WO | WO 2014195756 | 12/2014 |
| WO | WO 2016120628 | 8/2016 |
| WO | WO 2017046699 | 3/2017 |
| WO | WO 2017100707 | 7/2017 |

OTHER PUBLICATIONS

Daniel K. Griffin et al., Adhesive RFID Sensor Patch for Monitoring of Sweat Electrolytes, in IEEE transactions on bio-medical engineering—Nov. 2014.

Jong-Sun Pyo et al., "Development of a map matching method using the multiple hypothesis technique," 2001 IEEE Intelligent Transportation Systems Conference Proceedings—Oakland (CA), USA—Aug. 25-29, 2001.

Junjie Liu, Survey of Wireless Based Indoor Localization Technologies, arXiv: 1709.01015v2 [cs.NI] Mar. 14, 2018.

K. W. Cheung et al., "Least Squares Algorithms for Time-of-Arrival-Based Mobile Location," IEEE Transactions on Signal Processing, vol. 52, No. 4, Apr. 2004, pp. 1121-1128.

Kelvin M. Frazier et al., Fully-Drawn Carbon-Based Chemical Sensors on Organic and Inorganic Surfaces, Lab Chip. Oct. 21, 2014; 14(20): 4059-4066. doi:10.1039/c4lc00864b.

Mohammad Abu Alsheikh et al., "Machine Learning in Wireless Sensor Networks:Algorithms, Strategies, and Applications," arXiv:1405.4463v2 Mar. 19, 2015.

Muhammad F. Farooqui et al., "A paper based ink jet printed real time location tracking TAG," 2013 IEEE MTT-S International Microwave Symposium Digest (MTT).

Olyazadeh, Roya. (2012). Least Square Approach on Indoor Positioning Measurement Techniques.

Raphael Wimmer et al., Modular and deformable touch-sensitive surfaces based on time domain reflectometry, UIST 11 Proceedings of the 24th annual ACM symposium on User interface software and technology, pp. 517-526, Santa Barbara, California, USA—Oct. 16-19, 2011.

Simon Olberding et al., A cuttable multi-touch sensor, Proceeding UIST '13 Proceedings of the 26th annual ACM symposium on User interface software and technologypp. 245-254, St. Andrews, Scotland, United Kingdom—Oct. 8-11, 2013.

Wei Zhang et al., Deep Neural Networks for wireless localization in indoor and outdoor environments, Neurocomputing 194 (2016)279-287.

Nan-Wei Gong, C.-Y. Wang and J. A. Paradiso, "Low-cost Sensor Tape for Environmental Sensing Based on Roll-to-roll Manufacturing Process," In Proc. of IEEE Sensors 2012.

Notification of Transmittal of the International Search Report and the Written Opinion dated Mar. 29, 2019, in International Application No. PCT/US2018/064855, filed Dec. 11, 2018.

International Application No. PCT/US2018/064919, Written Opinion of the International Searching Authority, dated Apr. 5, 2019, 7 pages.

PCT International Search Report, International Application No. PCT/US20/50739 International search completed Nov. 18, 2020. International Search Report dated Dec. 18, 2020. pp. 1-2.

MVA Raju Bahubalendruni, HCL Technologies, Opticom, Optimization of Composite Laminate Stack-Up Sequence Using Differential Evolution Algorithm, Conference Paper, Oct. 2010, 35 pages.

Palavesam et al., Roll-to-Roll Processing of Film Substrates for Hybrid Integrated Flexible Electronics, 2018 IOP Publishing Ltd., Flexible and Printed Electronics, 2018, 19 pages.

Park et al., Improvement of Cross-Machine Directional Thickness Deviation for Uniform Pressure-Sensitive Adhesive Layer in Roll-to-Roll Slot-Die Coating Process, International Journal of Precision Engineering and Manufacturing, vol. 16, No. 5, pp. 937-938, May 2015.

* cited by examiner

ROLL-TO-ROLL METHOD OF FABRICATING A WIRELESS MULTI-LAYER LAMINATE

CROSS-REFERENCE TO RELATED APPLICATIONS

This application claims the benefit of U.S. Provisional Application No. 62/434,218, filed Dec. 14, 2016, and U.S. Provisional Application No. 62/435,207, filed Dec. 16, 2016, both of which are incorporated herein by reference.

BACKGROUND

Tracking devices can track people and objects in real time. These devices typically ascertain information relating to their physical locations based on communications with a variety of different wireless locationing systems (e.g., the Global Positioning System (GPS), cellular network systems (e.g., GSM), and wireless local area networks (e.g., a system of Wi-Fi access points). No single approach, however, provides continuous tracking information under all circumstances. For example, the GPS tracking requires a tracking device to have an unobstructed view of at least four GPS satellites at the same time, making GPS tracking in urban and indoor environments problematic. A variety of locationing techniques have been developed for tracking in indoor environments, including vision-based localization, wireless based localization (e.g., Received Signal Strength Indicator (RSSI) triangulation and fingerprinting techniques), and acoustic background fingerprinting. Each of these techniques, however, requires certain infrastructure support (e.g., wireless access points at known locations) and/or prior knowledge of the target environment (e.g., predetermined fingerprint maps) and therefore is associated with its own set of problems and limitations. Dead reckoning locationing based on motion sensor measurements also may be used, but the locationing accuracy of this approach is limited.

Tracking devices that incorporate multiple locationing mechanisms have been proposed to provide localization functionality across heterogeneous environments, ranging from environments equipped with localization equipment (e.g., satellites, cellular towers, and wireless access points), to environments without any localization equipment. However, incorporating a variety of different locationing components into a tracking device poses significant integration difficulties and challenges optimizing weight, size, cost, and battery life for a given application. In addition, localization techniques used in areas without any infrastructure support are notoriously inaccurate and typically require a person to physically traverse a storage facility until the person is close enough to the target to distinguish the signals (e.g., RFID signals) emitted from multiple co-located tracking devices. Thus, there still remains a need to address the lack of sufficient infrastructure to support continuous tracking across different environments.

SUMMARY

This specification describes a low-cost, multi-function tracking system with a form factor that unobtrusively integrates the components needed to implement a combination of different localization techniques and also is able to perform a useful ancillary function that otherwise would have to be performed with the attendant need for additional materials, labor, and expense.

In an aspect, the tracking system is implemented as an adhesive product that integrates tracking components within a flexible adhesive structure in a way that not only provides a cost-effective platform for interconnecting, optimizing, and protecting the components of the tracking system but also maintains the flexibility needed to function as an adhesive product that can be deployed seamlessly and unobtrusively into various tracking applications and workflows, including person and object tracking applications, and asset management workflows such as manufacturing, storage, shipping, delivery, and other logistics associated with moving products and other physical objects.

The adhesive product can have a variety of form factors, including a multilayer roll or sheet that includes a plurality of divisible adhesive segments each of which is equipped with tracking functionality. Once deployed, each adhesive segment can function, for example, as an adhesive tape, label, sticker, decal, or the like and, at the same time, as an inconspicuous location tracker. In examples, each adhesive segment can track location information either autonomously or collectively with other activated segments. In an autonomous mode of operation, an adhesive segment can be configured to communicate with a variety of different wireless locationing systems and equipment to determine or assist in determining information relating to its geographic or relative location. In a collective mode of operation, a set of segments can additionally communicate with one another to self-organize and self-configure into, for example, a mesh network and, thereby, create mechanisms or opportunities for acquiring and/or sharing acquired location information in or across areas that are not supported by existing infrastructure equipment.

Embodiments of the subject matter described in this specification include methods, processes, systems, apparatus, and tangible non-transitory carrier media encoded with one or more program instructions for carrying out one or more methods and processes for enabling tracking and fabrication functionalities of the described systems and apparatus.

In accordance with particular embodiments, a tracking adhesive product includes a plurality of segments of a flexible laminated structure comprising a flexible cover and a flexible substrate laminated to a pressure sensitive adhesive layer. Each segment includes components comprising: a flexible antenna; a wireless communication system coupled to the flexible antenna; a processor coupled to the wireless communications system; an energy source coupled to the processor and the wireless communication system; and at least one non-transitory processor-readable medium comprising instructions which, when executed by the processor, configures the processor to perform operations comprising controlling the wireless communication system to communicate wireless messages with one or more network nodes associated with a locationing service.

In particular embodiments, each of the plurality of segments includes the flexible antenna, the wireless communication system, and the processor arranged in a device layer between the flexible cover and the substrate. In some examples, the energy source is arranged in the device layer; in other examples, the energy source is arranged between the device layer and the flexible substrate. In some examples, the energy source includes a cylindrical single cell battery arranged in the device layer between the flexible cover and the substrate. In some examples, the energy source includes a planar flexible battery arranged between the device layer and the substrate.

Some embodiments include a flexible planarization layer between the device layer and the flexible cover, where the planarization layer planarizes the device layer with a substantially planar surface facing the flexible cover. In some examples, the flexible planarization layer includes a flexible epoxy.

In particular embodiments, peripheral portions of the flexible cover and the flexible substrate are bonded together.

Particular embodiments of the tracking adhesive product additionally include peripheral sidewalls adhered to the flexible cover and the flexible substrate of the tracking adhesive product. In some examples, the peripheral sidewalls include extensions of one or both of the flexible cover and the flexible substrate.

In particular embodiments, one or more of the components are arranged in a first device layer and one or more other ones of the components are arranged in a second device layer. In some examples, an interposer is between the first and second device layers and includes one or more through-interposer vias electrically coupling one or more of the components in the first device layer with one or more of the components in the second device layer.

In particular embodiments, the flexible substrate and the pressure sensitive adhesive layer are elements of a prefabricated adhesive tape. The flexible cover can be an element of a prefabricated adhesive tape. Each segment can additionally include one or more sensors selected from an altimeter, a gyrator, an accelerometer, a temperature sensor, and a strain sensor.

In particular embodiments, each of the plurality of segments is configured to automatically turn on in response to separation of the respective segment from the tracking adhesive product. In some examples, each of the plurality of segments comprises a respective wake circuit that delivers power from the respective energy source to the respective processor and the respective wireless communications system in response to an event. In some examples, the respective wake circuit delivers power to the processor and the wireless communications system in response to a cut across the tracking adhesive product that creates an open circuit in an electrical path of the respective wake circuit. In some examples, a segment comprises a respective sensor, and the respective wake circuit delivers power to the respective processor and the respective wireless communications system in response to an output of the sensor. In some examples, a segment includes a strain sensor that produces a wake signal based on a change in strain in the respective segment. In some examples, a segment includes a capacitive sensor that produces a wake signal based on a change in capacitance in the respective segment. In some examples, a segment comprises a near field communications sensor that produces a wake signal based on a change in inductance in the respective segment.

In particular embodiments, the flexible cover comprises visible demarcations of respective sections of the tracking adhesive product that correspond to the segments. In some examples, the tracking adhesive product is in the form of a roll comprising the plurality of segments. In some examples, the tracking adhesive product is in the form of a planar sheet comprising the plurality of segments.

In particular embodiments, the different sections of the tape communicate thru a roll communication network.

In particular embodiments, a mobile phone is used to configure the tape (e.g., wake up conditions, tracking intervals) as well as associate to the unique tape specific information such as a picture of the package that the user wants to track using the tracking adhesive product.

In particular embodiments, the frequency of measuring location can be different than the frequency of communication the location information.

In particular embodiments, the communicate medium is also used for locationing (vs. for example separate cellular connection and separate GPS).

In particular embodiments, the tape pro-actively sends a signal and deals with upcoming battery shortage (e.g., thru shutting down or going to a lower battery consumption mode).

Particular embodiments perform a method of fabricating a tracking adhesive product. In accordance with these embodiments a flexible tape substrate comprising a first adhesive layer is provided. At each of respective segment locations along the flexible tape substrate, one or more device layers are formed, the one or more device layers comprising one or more additional adhesive layers, an energy source, and a respective flexible circuit electrically connecting one or more components configured to perform one or more location tracking functions. A flexible tape cover comprising a second adhesive layer is provided. The one or more device layers between the flexible tape substrate and the flexible tape cover are annealed to form a flexible composite tracking adhesive product structure.

In some examples of the fabrication method, the energy source includes a flexible battery, and the one or more components electrically connected by the respective flexible circuit comprise a processor, a flexible antenna, and a wireless communication circuit. The method further comprises, at locations on a flexible carrier tape corresponding the respective segment locations, fixing the processor, the flexible antenna, and the wireless communication circuit on the respective flexible circuit to form a respective flexible circuit assembly. Each respective flexible circuit assembly is incorporated into one of the one or more device layers at a respective segment location along the flexible tape substrate.

In some examples, the fabrication method further includes planarizing each device layer with a flexible polymer adhesive.

Other features, aspects, objects, and advantages of the subject matter described in this specification will become apparent from the description, the drawings, and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

In the instant specification, a tracking adhesive product is described that includes a plurality of segments that can be separated from the adhesive product (e.g., by cutting, tearing, peeling, or the like) and adhesively attached to a variety of different surfaces to inconspicuously implement any of a wide variety of different tracking applications. Examples of such applications include inventory tracking, package tracking, person tracking, animal (e.g., pet) tracking, manufacturing parts tracking, and vehicle tracking. In example embodiments, each segment of an adhesive product is equipped with an energy source, wireless communication functionality, and processing functionality that enable the segment to perform one or more locationing functions and report the locationing results to a remote server or other computer system. The tracking components of the system are encapsulated within a flexible adhesive structure that protects the tracking components from damage while maintaining the flexibility needed to function as an adhesive product (e.g., an adhesive tape or label) for use in various tracking applications and workflows. In addition to tracking functions, example embodiments also include one or more sensors that extend the utility of the platform by providing supplemental information regarding characteristics of the state and or environment of a tracked article, object, vehicle, or person over time.

The instant specification also describes systems and processes for fabricating flexible multifunction adhesive products in efficient and low-cost ways. In addition to using roll-to-roll and/or sheet-to-sheet manufacturing techniques, the fabrication systems and processes are configured to optimize the placement and integration of tracking components within the flexible adhesive structure to achieve high flexibility and ruggedness. In this way, these fabrication systems and processes are able to create a useful and reliable tracking adhesive products that also can provide locationing and, in some examples, ambient sensing functionality. This functionality together with the low cost of production is expected to encourage the ubiquitous deployment of adhesive product segments and thereby alleviate at least some of the problems arising from gaps in conventional locationing infrastructure coverage that prevent continuous tracking across heterogeneous environments.

Figure 1A:
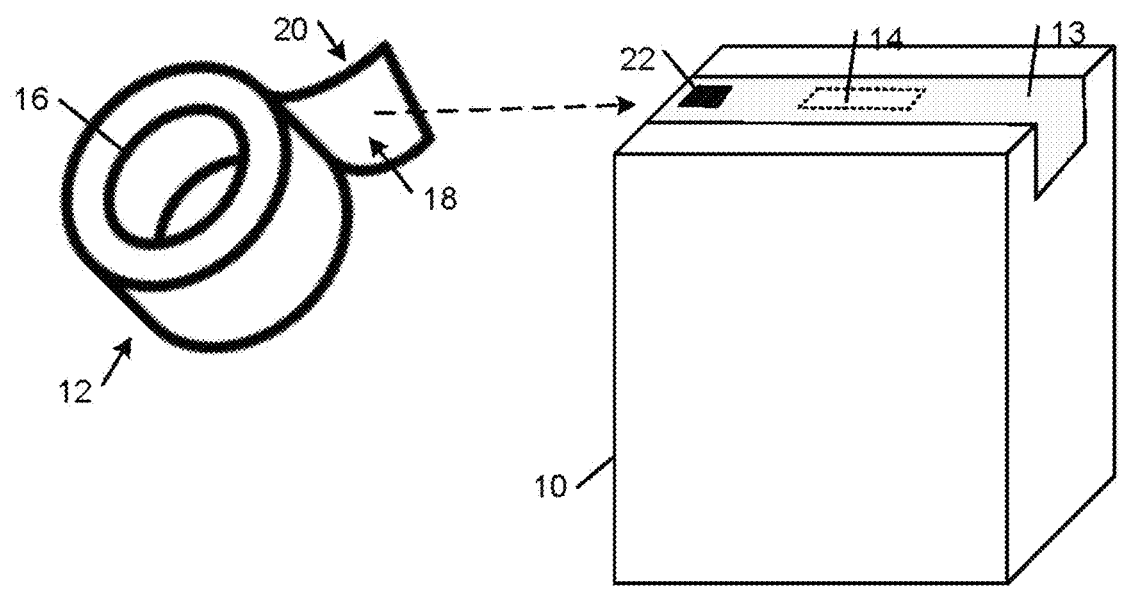
FIG. 1A is a diagrammatic view of a package that has been sealed for shipment using a segment of an example tracking adhesive product dispensed from a roll.

FIG. 1A shows an example package 10 that is sealed for shipment using an example tracking adhesive product 12 that includes embedded tracking components 14. In this example, a segment 13 of the tracking adhesive product 12 is dispensed from a roll 16 and applied to the package 10. The tracking adhesive product 12 includes an adhesive side 18 and a non-adhesive side 20. The tracking adhesive product 12 can be dispensed from the roll 16 in the same way as any conventional packing tape, shipping tape, or duct tape. For example, the tracking adhesive product 12 may be dispensed from the roll 16 by hand, laid across the seam where the two top flaps of the package 10 meet, and cut to a suitable length either by hand or using a cutting instrument (e.g., scissors or an automated or manual tape dispenser).

Figure 1B:
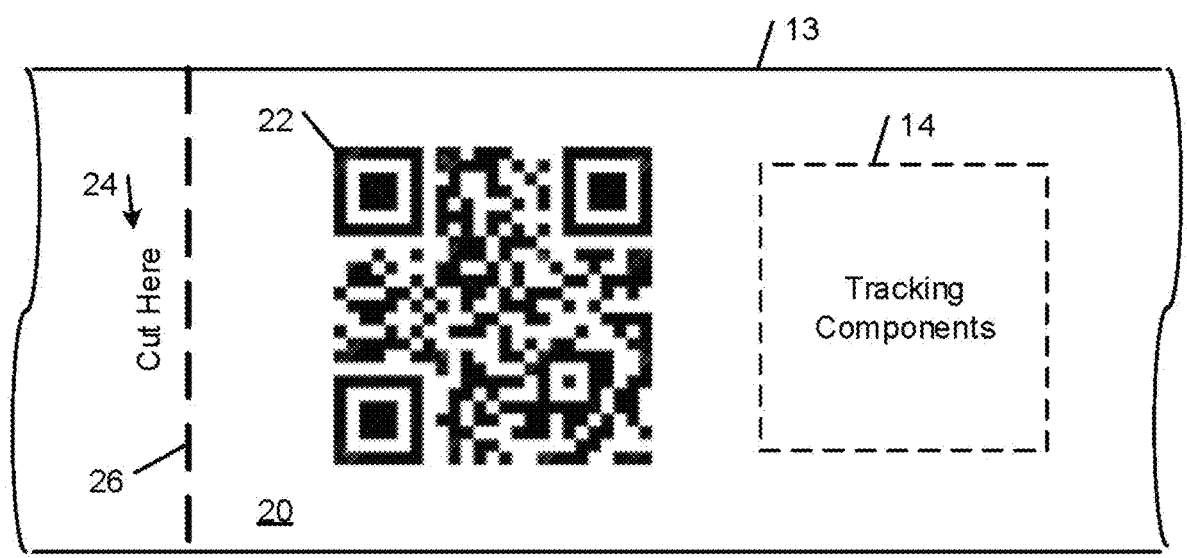
FIG. 1B is a diagrammatic top view of a portion of the segment of the example tracking adhesive product shown in FIG. 1A.

Referring to FIG. 1B, in some examples, the non-adhesive side 20 of the segment 13 of the adhesive product 12 includes writing or other markings that may convey instructions, warnings, or other information to a person or machine (e.g., a bar code reader), or may simply be decorative and/or entertaining. In the illustrated example, the segment 13 of the tracking adhesive product 12 includes a two-dimensional bar code 22, written instructions 24 (i.e., "Cut Here"), and an associated cut line 26 that indicates where the user should cut the tracking adhesive product 12. The written instructions 24 and the cut line 26 typically are printed or otherwise marked on the top, non-adhesive surface 20 of the tracking adhesive product 12 during manufacture. The two-dimensional bar code 22, on the other hand, may be marked on the non-adhesive surface 20 of the tracking adhesive product 12 during the manufacture of the adhesive product 12 or, alternatively, may be marked on the non-adhesive surface 20 of the tracking adhesive product 12 as needed using, for example, a printer or other marking device.

In order to avoid damage to the tracking functionality of the segments of the tracking adhesive product 12, the cut lines 26 typically demarcate the boundaries between adjacent segments at locations that are free of any tracking components 14. The spacing between the tracking components 14 and the cut lines 26 may vary depending on the intended tracking application or the intended adhesive application. In the example illustrated in FIG. 1A, the length of the tracking adhesive product 12 that is dispensed to seal the package 10 corresponds to a single segment of the tracking adhesive product 12. In other examples, the length of tracking adhesive product 12 needed to seal a package or otherwise serve the adhesive function for which the tracking adhesive product is being applied may include multiple segments 13 of the tracking adhesive product 12, one or more of which segments 13 may be activated upon cutting the length of the tracking adhesive product 12 from the roll 16 and/or applying the length of the tracking adhesive product to the package 10.

In some examples, the tracking components 14 embedded in one or more segments 13 of the tracking adhesive product 12 are activated when the adhesive product 12 is cut along the cut line 26. In these examples, the tracking adhesive product 12 includes one or more embedded energy sources (e.g., thin film batteries or conventional cell batteries, such as conventional watch style batteries) that supply power to the tracking components 14 in one or more segments of the tracking adhesive product 12 in response to being separated from the adhesive product 12 (e.g., along a cut line 26).

In some examples, each segment 13 of the tracking adhesive product 12 includes its own respective energy source. In some of these examples, each energy source is configured to only supply power to the components in its respective tracking adhesive product segment regardless of the number of contiguous segments 13 that are in a given length of tracking adhesive product 12. In other examples, when a given length of the tracking adhesive product 12 includes multiple segments 13, the energy sources in the respective segments 13 are configured to supply power to the tracking components 14 in all of the segments 13 in the given length of the tracking adhesive product 12. In some of these examples, the energy sources are connected in parallel and concurrently activated to power the tracking components 14 in all of the segments 13 at the same time. In other ones of these examples, the energy sources are connected in parallel and alternately activated to power the tracking components 14 in respective ones of the tracking adhesive product segments 13 at different time periods, which may or may not overlap.

Figure 2:
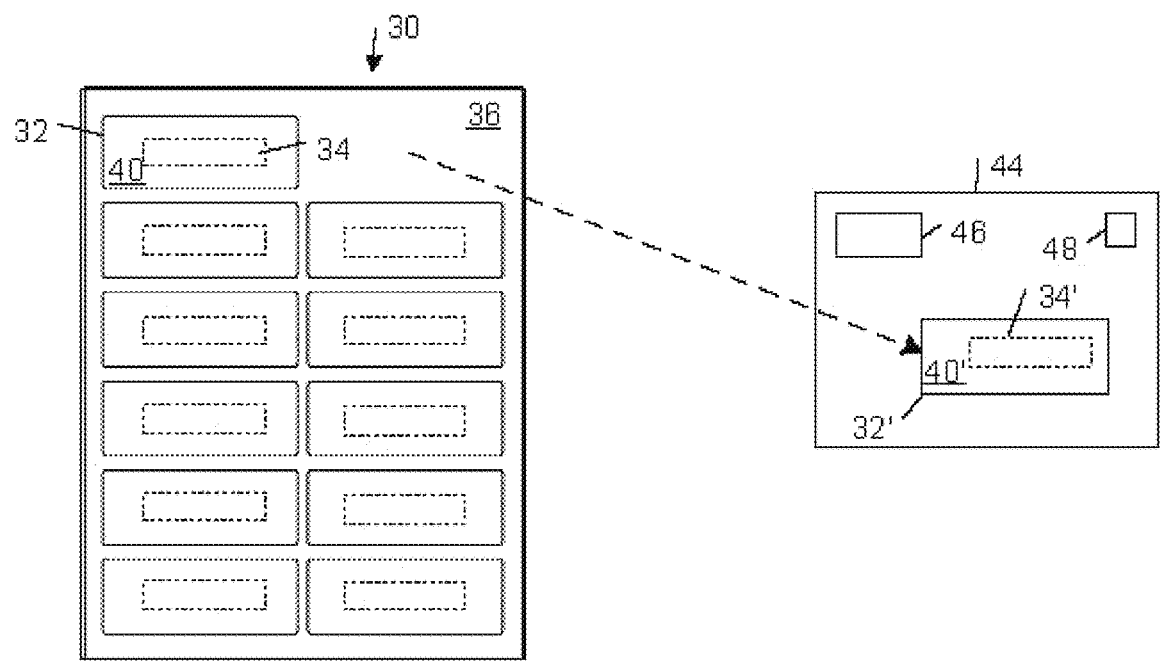
FIG. 2 is a diagrammatic view of an example of an envelope carrying a segment of an example tracking adhesive product dispensed from a backing sheet.

FIG. 2 shows an example tracking adhesive product 30 that includes a set of adhesive segments 32 each of which includes a respective set of embedded tracking components 34, and a backing sheet 36 with a release coating that prevents the adhesive segments 34 from adhering strongly to the backing sheet 36. Each segment 32 includes an adhesive side facing the backing sheet 36, and an opposing non-adhesive side 40. In this example, a particular segment 32' of the tracking adhesive product 30 has been removed from the backing sheet 36 and affixed to an envelope 44. Each segment 32 of the tracking adhesive product 30 can be removed from the backing sheet 36 in the same way that adhesive labels can be removed from a conventional sheet of adhesive labels (e.g., by manually peeling a segment 32 from the backing sheet 36). In general, the non-adhesive side 40' of the segment 32' may include any type of writing, markings, decorative designs, or other ornamentation. In the illustrated example, the non-adhesive side 40' of the segment 32' includes writing or other markings that correspond to a destination address for the envelope 44. The envelope 44 also includes a return address 46 and, optionally, a postage stamp or mark 48.

In some examples, the tracking components 34 that are embedded in a segment 32 of the tracking adhesive product 12 are activated when the segment 32 is removed from the backing sheet 32. In some of these examples, each segment 32 includes an embedded capacitive sensing system that can sense a change in capacitance when the segment 32 is removed from the backing sheet 36. As explained in detail below, a segment 32 of the adhesive product 30 includes one or more embedded energy sources (e.g., thin film batteries or common disk-shaped cell batteries) that can be configured to supply power to the tracking components 34 in the segment 32 in response to the detection of a change in capacitance between the segment 32 and the backing sheet 36 as a result of removing the segment 32 from the backing sheet 36.

Figure 3:
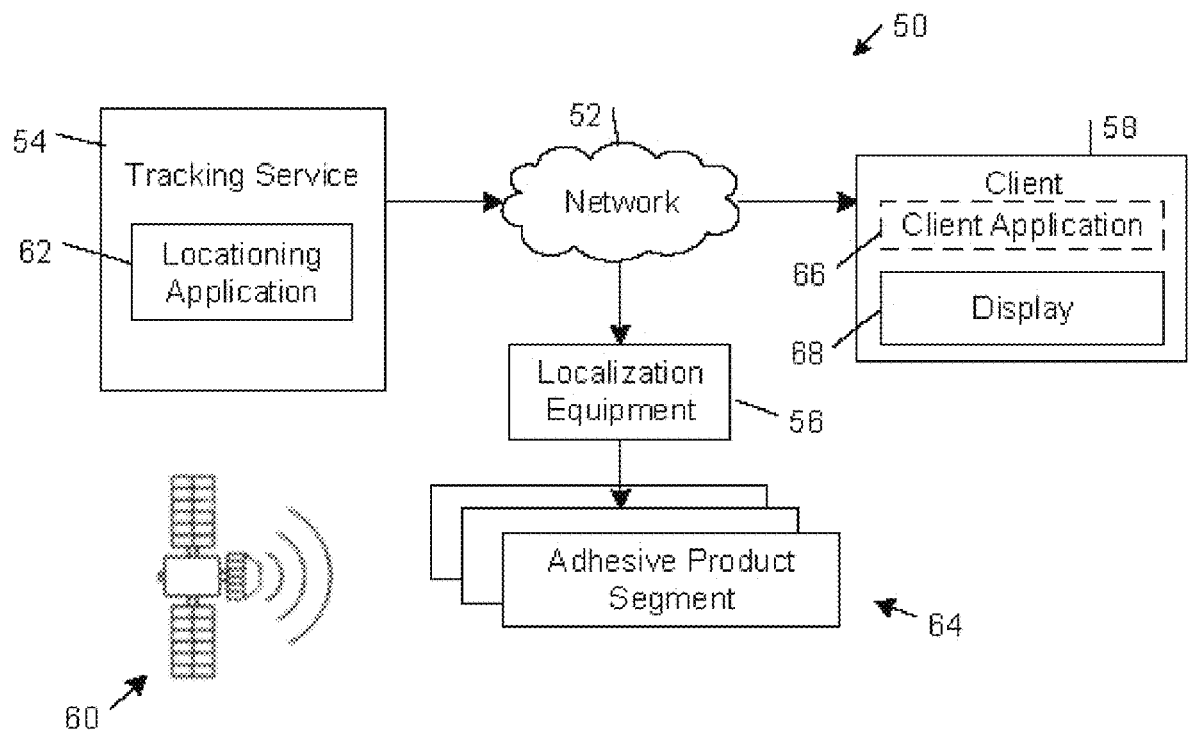
FIG. 3 is a diagrammatic view of an example of a network environment supporting location tracking with segments of tracking adhesive products.

FIG. 3 shows an example network environment 50 that includes a network 52 that supports communications between a tracking service 54, localization equipment 56, and a client device 58. The network 52 includes one or more network communication systems and technologies, including any one or more of wide area networks, local area networks, public networks (e.g., the internet), private networks (e.g., intranets and extranets), wired networks, and wireless networks. The localization equipment 56 includes any one or more of (i) satellite based tracking systems 60 (e.g., GPS, GLONASS, and NAVSTAR) that transmit geolocation data that can be received by suitably equipped receivers in segments of a tracking adhesive product, (ii) cellular based systems that use mobile communication technologies (e.g., GSM, GPRS, CDMA, etc.) to implement one or more cell-based localization techniques, and (iii) localization equipment 56, such as wireless access points (e.g., Wi-Fi nodes, Bluetooth nodes, ZigBee nodes, etc.) and other shorter range localization technologies (e.g., ultrasonic localization and/or dead reckoning based on motion sensor measurements).

As explained in detail below, location data for one or more activated tracking adhesive product segments 64 can be obtained using one or more of the localization systems and technologies described above.

For example, a tracking adhesive product segment 64 that includes a GPS receiver is operable to receive location data (e.g., geolocation data) from the Global Positioning System (GPS). In this process, the tracking adhesive product segment 64 periodically monitors signals from multiple GPS satellites. Each signal contains information about the time the signal was transmitted and the position of the satellite at the time of transmission. Based on the location and time information for each of four or more satellites, the GPS receiver determines the geolocation of the tracking adhesive product segment 64 and the offset of its internal clock from true time. Depending on its configuration, the tracking adhesive product segment 64 can either forward the received GPS location data to the tracking service 54 to determine its geolocation, or first compute geolocation coordinates from the received GPS location data and report the computed geolocation coordinates to the tracking service 54. However, the tracking adhesive product segment 64 can only determine its GPS location when it is able to receive signals from at least four GPS satellites at the same time. As a result, GPS localization typically is limited or unavailable in urban environments and indoor locations.

Instead of or in addition to GPS localization, a tracking adhesive product segment 64 can be configured to determine or assist in determining its location using terrestrial locationing techniques. For example, Received Signal Strength Indicator (RSSI) techniques may be used to determine the location of a tracking adhesive product segment 64. These techniques include, for example, fingerprint matching, trilateration, and triangulation. In an example RSSI fingerprinting process, one or more predetermined radio maps of a target area are compared to geo-reference RSSI fingerprints that are obtained from measurements of at least three wireless signal sources (e.g., cellular towers or wireless access points) in the target area to ascertain the location of the tracking adhesive product segment 64. The predetermined radio maps typically are stored in a database that is accessible by the tracking service 54. In example RSSI triangulation and trilateration processes, the location of a tracking adhesive product segment 64 can be determined from measurements of signals transmitted from at least three omnidirectional wireless signal sources (e.g., cellular towers or wireless access points). Examples of the triangulation and trilateration localization techniques may involve use of one or more of time of arrival (TOA), angle of arrival (AOA), time difference of arrival (TDOA), and uplink-time difference of arrival (U-TDOA) techniques. RSSI fingerprint matching, trilateration, and triangulation techniques can be used with cellular and wireless access points that are configured to communicate with any of a variety of different communication standards and protocols, including GSM, CDMA, Wi-Fi, Bluetooth, Bluetooth Low Energy (BLE), LoRa, ZigBee, Z-wave, and RF.

In some examples, a tracking adhesive product segment 64 that includes a GSM/GPRS transceiver can scan GSM frequency bands for signals transmitted from one or more GSM cellular towers. For each signal received by the tracking adhesive product segment 64, the tracking adhesive product segment 64 can determine the signal strength and the identity of the cellular tower that transmitted the signal. The tracking adhesive product segment 64 can send the signal strength and transmitter identifier to the tracking service 54 to determine the location of the adhesive product segment 64. If signal strength and transmitter identifier is available from only one cellular tower, the tracking service 54 can use nearest neighbor localization techniques to determine the location of the tracking adhesive product segment 64. If signal strength and transmitter identifier is received from two or more cellular towers, the tracking service 54 can use localization techniques, such as fingerprint matching, trilateration, and triangulation, to calculate the position of the tracking adhesive product segment 64.

In some examples, a tracking adhesive product segment 64 that includes a Wi-Fi (Wireless-Fidelity) transceiver can scan Wi-Fi frequency bands for signals transmitted from one or more Wi-Fi access points. For each signal received by the tracking adhesive product segment 64, the tracking adhesive product segment 64 can determine the signal strength and the identity of the access point that transmitted the signal. The tracking adhesive product segment 64 can send the signal strength and transmitter identifier information to the tracking service 54 to determine the location of the adhesive product segment 64. If signal strength and transmitter identifier information is available from only one Wi-Fi access point, the tracking service 54 can use nearest neighbor localization techniques to determine a location of the adhesive product segment 64. If signal strength and transmitter identifier information is received from two or more Wi-Fi access points, the tracking service 54 can use localization techniques, such as trilateration, and triangulation, to calculate the position of an adhesive product segment 64. RSSI fingerprint matching also can be used to determine the location of the tracking adhesive product segment 64 in areas (e.g., indoor and outdoor locations, such as malls, warehouses, airports, and shipping ports) for which one or more radio maps have been generated.

In some examples, the wireless transceiver in the tracking adhesive product segment 64 can transmit a wireless signal (e.g., a Wi-Fi, Bluetooth, Bluetooth Low Energy, LoRa, ZigBee, Z-wave, and/or RF signal) that includes the identifier of the tracking adhesive product segment 64. The wireless signal can function as a beacon that can be detected by a mobile computing device (e.g., a mobile phone) that is suitably configured to ascertain the location of the source of the beacon. In some examples, a user (e.g., an operator affiliated with the tracking service 54) may use the mobile computing device to transmit a signal into an area (e.g., a warehouse) that includes the identifier of a target tracking adhesive product segment 64 and configures the target tracking adhesive product segment 64 to begin emitting the wireless beacon signal. In some examples, the target tracking adhesive product segment 64 will not begin emitting the wireless beacon signal until the user/operator self-authenticates with the tracking service 54.

The tracking service 54 includes one or more computing resources (e.g., server computers) that can be located in the same or different geographic locations. The tracking service 54 executes a locationing application 62 to determine the locations of activated tracking adhesive product segments 64. In some examples, based on execution of the locationing application 62, the tracking service 54 receives location data from one or more of the adhesive product segments 64. In some examples, the tracking service 54 processes the data received from tracking adhesive product segments 64 to determine the physical locations of the tracking adhesive product segments 64. For example, the adhesive product segments 64 may be configured to obtain locationing information from signals received from a satellite system (e.g., GPS, GLONASS, and NAVSTAR), cell towers, or wireless access points, and send the locationing information to the tracking service 54 to ascertain the physical locations of the tracking adhesive product segments 64. In other examples, the tracking adhesive product segments 64 are configured to ascertain their respective physical locations from the signals received from a satellite system (e.g., GPS, GLONASS, and NAVSTAR), cell towers, or wireless access points, and to transmit their respective physical locations to the tracking service 54. In either or both cases, the tracking service 54 typically stores the locationing information and/or the determined physical location for each tracking adhesive product segment in association with the respective unique identifier of the tracking adhesive product segment. The stored data may be used by the tracking service 54 to determine time, location, and state (e.g., sensor based) information about the tracking adhesive product segments 64 and the objects or persons to which the tracking adhesive product segments 64 are attached. Examples of such information include tracking the current location of a tracking adhesive product segment 64, determining the physical route traveled by the tracking adhesive product segment 64 over time, and ascertaining stopover locations and durations.

As shown FIG. 3, the client device 58 includes a client application 66 and a display 68. The client application 66 establishes sessions with the tracking service 54 during which the client application obtains information regarding the locations of the tracking adhesive product segments 64. In some examples, a user of the client device 58 must be authenticated before accessing the tracking service 54. In this process, the user typically presents multiple authentication factors to the system (e.g., user name and password). After the user is authenticated, the tracking service 54 transmits to the client device 58 data associated with the user's account, including information relating to the tracking adhesive product segments 64 that are associated with the user's account. The information may include, for example, the current location of a particular tracking adhesive product segment 64, the physical route traveled by the tracking adhesive product segment 64 over time, stopover locations and durations, and state and/or changes in state information (as measured by one or more sensors associated with the tracking adhesive product segment 64). The information may be presented in a user interface on the display 68. Location and state information may be presented in the user interface in any of a variety of different ways, including in a table, chart, or map. In some examples, the location and state data presented in the user interface are updated in real time.

Figure 4:
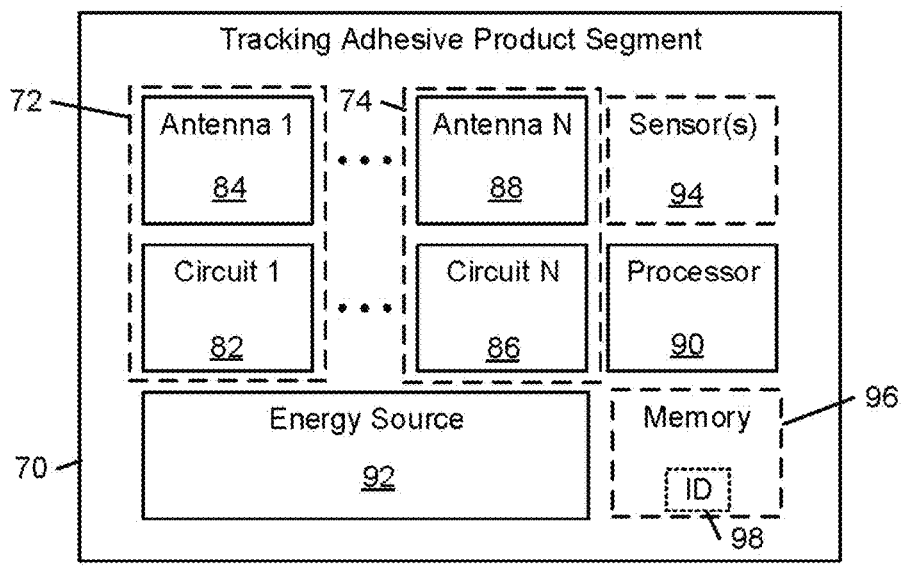
FIG. 4 is a schematic view of an example tracking adhesive product segment.

FIG. 4 shows a block diagram of the components of a segment 70 of a tracking adhesive product 64. The tracking adhesive product segment 70 includes a number of communication systems 72, 74, an energy source 76, a processor 78, and, optionally, one or more sensors 80. Example communication systems 72, 74 include a GPS system that includes a GPS receiver circuit 82 (e.g., a receiver semiconductor circuit) and a GPS antenna 84, and one or more wireless communication systems each of which includes a respective transceiver circuit 86 (e.g., a transceiver semiconductor circuit) and a respective antenna 88. Example wireless communication systems include a cellular communication system (e.g., GSM/GPRS), a Wi-Fi communication system, an RF communication system (e.g., LoRa), a Bluetooth communication system (e.g., a Bluetooth Low Energy system), a Z-wave communication system, and a ZigBee communication system. The tracking adhesive product segment 70 also includes a processor 90 (e.g., a microcontroller or microprocessor), an energy source 92 (e.g., a printed flexible battery or a conventional single or multiple cell battery), and, optionally, one or more sensors 94. Example sensors include a capacitive sensor, an altimeter, a gyroscope, an accelerometer, a temperature sensor, a strain sensor, a pressure sensor, a light sensor, and a humidity sensor. In some examples, the tracking adhesive product segment 70 includes a memory 96 for storing data (e.g., localization data and a unique identifier 98 associated with the segment 70). In some examples, the memory 96 may be incorporated into one or more of the processor 90 or sensors 94, or may be a separate component that is integrated in the tracking adhesive product segment 70 as shown in FIG. 4.

Each segment 70 of the tracking adhesive product 64 integrates components of a tracking system with a flexible adhesive structure in a way that not only provides a cost-effective platform for interconnecting, optimizing, and protecting the components of the tracking system but also maintains the flexibility needed to function as a flexible adhesive product (e.g., a functional flexible tape or label) that can be deployed seamlessly and unobtrusively into various tracking applications and workflows, including person and object tracking applications, and asset management workflows such as manufacturing, storage, delivery, and other logistics associated with products and other physical objects. In addition, in order to encourage the ubiquitous deployment of tracking adhesive product segments, the disclosed tracking adhesive products are designed to be fabricated using cost-effective fabrication methods, including roll-to-roll and sheet-to-sheet fabrication processes.

In this regard, the components of a tracking adhesive product 64 are designed and arranged to optimize performance, flexibility, and robustness for each target application. This encompasses factors, such as material selection, component layout, and mechanical integrity of the integrated system. To this end, electronic design automation tools are used to optimize the design across the constituent layers of a tracking adhesive product given prescribed performance targets (e.g., mechanical integrity targets, electrical performance targets, and/or wireless communication performance targets). This includes simulations of electromagnetic wave behavior across layers, heat dissipation behavior, electrical parasitic behavior across layers (e.g., inductances, capacitances, and resistances), and mechanical behaviors (e.g., the impact of bending and impressing bonding patterns on the tracking adhesive product 64). Based on these simulations, process technology design rules are developed for designing tracking adhesive products, including rules for integrating layers, rules for selecting the number of layers, and rules for selecting the types of layers (e.g., through interposer vias, component layers, cover layers, substrate layers, and adhesive layers). In some examples, design rules are developed regarding the layout of components in the different layers of a tracking adhesive product 64. For example, minimum spacing and/or proximity rules are developed for the placement of antennas, rigid components, flexible components, passive components, and active components. In these examples, rigid and active components, such as the communication circuits 82, 86 (e.g., receivers, transmitters, and transceivers) and the processor 90, can have larger minimum spacing requirements than flexible and passive components. In some examples, rigid components are spaced apart according to minimum spacing rules to satisfy mechanical integrity and flexibility performance targets. In some examples, active components are laid out according to minimum spacing rules to satisfy heat dissipation performance targets. In some examples, design rules are developed for hierarchical assembly of a tracking adhesive product by integrating smaller tracking adhesive product components to form a larger integrated tracking adhesive product system.

Figure 5A:
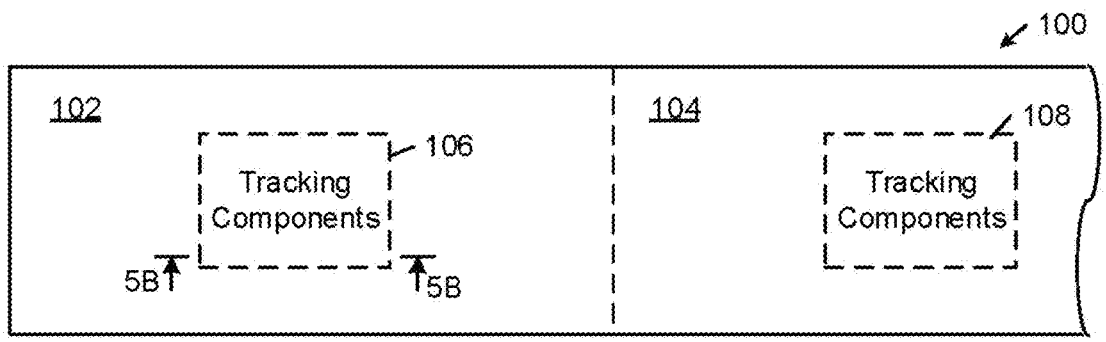
FIG. 5A is a diagrammatic top view of a length of an example tracking adhesive product.

FIG. 5A shows a top view of a portion of an example tracking adhesive product 100 that includes a first segment 102 and a portion of a second segment 104. Each segment 102, 104 of the tracking adhesive product 100 includes a respective set of tracking components 106, 108. The segments 102, 104 and their respective sets of tracking components 106, 108 typically are identical and configured in the same way. In some other embodiments, however, the segments 102, 104 and/or their respective sets of tracking components 106, 108 may be different and/or configured in different ways. For example, in some examples, different sets of the segments of the tracking adhesive product 100 may have different sets or configurations of tracking components that are designed and/or optimized for different tracking applications, or different sets of tracking adhesive product segments may have different ornamentations and/or different (e.g., alternating) lengths.

Figure 5B:
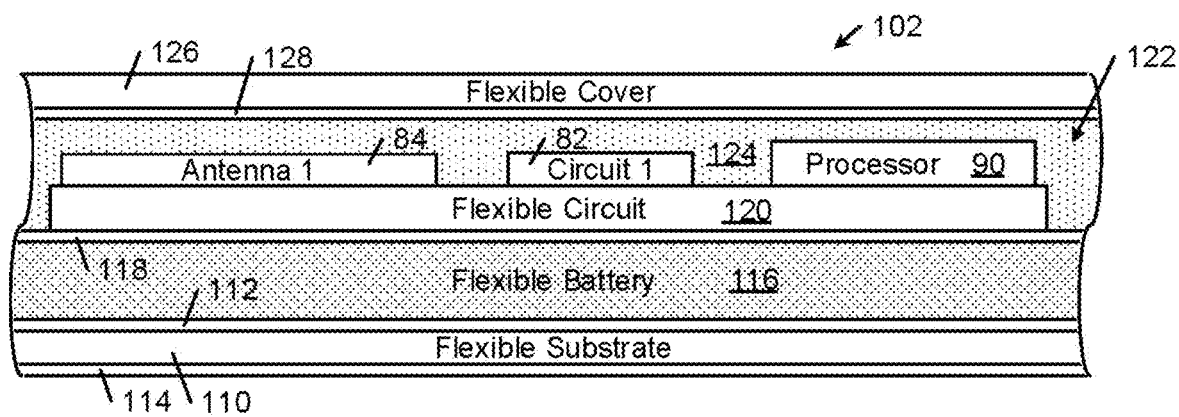
FIG. 5B is a diagrammatic cross-sectional side view of a portion of the tracking adhesive product shown in FIG. 5A.

FIG. 5B shows a cross-sectional side view of a portion of a segment 102 of the tracking adhesive product 100 that includes tracking components 106. The tracking adhesive product segment 102 includes a flexible substrate 110 with an adhesive layer 112 on its top surface and an optional adhesive layer 114 on its bottom surface. If the bottom adhesive layer 114 is present, a release liner (not shown) may be (weakly) adhered to the bottom surface of the adhesive layer 114. In some examples, the flexible substrate 110 is implemented as a prefabricated adhesive tape that includes the adhesive layers 112, 114 and the optional release liner. In other examples, the adhesive layers 112, 114 are applied to the top and bottom surfaces of the flexible substrate 110 during the fabrication of the tracking adhesive product 100. The adhesive layer 112 bonds the flexible substrate 110 to a bottom surface of a flexible battery 116, and an adhesive layer 118 bonds the flexible battery 116 to a flexible circuit 120 that includes one or more wiring layers (not shown) that connect the processor 90, the circuit 82, the antenna 84, and other components in a device layer 122 to each other and to the flexible battery 116 and, thereby, enable the tracking and other functionalities of the tracking adhesive product segment 102. In some examples, the adhesive layer 118 is implemented by a double-sided adhesive tape. In other examples, the adhesive layer 118 is implemented by a flexible adhesive (e.g., silicone) that can planarize the top portion of the flexible battery layer. A flexible polymer layer 124 encapsulates the device layer 122 and thereby reduces the risk of damage that may result from the intrusion of contaminants and/or liquids (e.g., water). The flexible polymer layer 124 also planarizes the device layer 122. This facilitates stacking of additional layers on the device layer 122 and also distributes forces generated in, on, or across the tracking adhesive product segment 102 so as to reduce potentially damaging asymmetric stresses that might be caused by the application of bending, torqueing, pressing, or other forces on the tracking adhesive product segment 102 during use. A flexible cover 128 is bonded to the planarizing polymer 124 by an adhesive layer 128.

The flexible cover 126 and the flexible substrate 110 may have the same or different compositions depending on the intended locationing application. The flexible cover 126 and the flexible substrate 110 typically include flexible film layers and/or paper substrates. Example compositions for the flexible film layers include polymer films, such as polyester, polyimide, polyethylene terephthalate (PET), and other plastics. The adhesive layer 128 on the bottom surface of the flexible cover 126 and the adhesive layers 112, 114 on the top and bottom surfaces of the flexible substrate 110 typically include a pressure-sensitive adhesive. In some examples, the adhesive layers 128, 112, 110 are applied to the flexible cover 126 and the flexible substrate 110 during manufacture of the tracking adhesive product 100 (e.g., during a roll-to-roll or sheet-to-sheet fabrication process). In other examples, the flexible cover 126 may be implemented by a prefabricated single-sided pressure-sensitive adhesive tape and the flexible substrate 110 may be implemented by a prefabricated double-sided pressure-sensitive adhesive tape; both kinds of tape may be readily incorporated into a roll-to-roll or sheet-to-sheet fabrication process. In some examples, the flexible polymer layer 122 is composed of a flexible epoxy (e.g., silicone).

In some examples, the flexible battery 116 includes a printed electrochemical cell that includes a planar arrangement of an anode and a cathode and battery contact pads. In some examples, the flexible battery may include lithium-ion cells or nickel-cadmium electro-chemical cells. The flexible battery 116 typically is formed by process that includes printing or laminating the electro-chemical cells on a flexible substrate (e.g., a polymer film layer). In some examples, such as the example shown in FIGS. 11A-11B, other components may be integrated on the same substrate as the flexible battery 116. For example, one or more of the flexible antennas 84, 88, the circuits 82, 86, 120, and/or the processor 90 may be integrated on the flexible battery substrate. In some examples, one or more of these other components also (e.g., the flexible antennas and the flexible interconnect circuits) may be printed on the flexible battery substrate.

In some examples, the flexible circuit 120 is formed on a flexible substrate by printing, etching, or laminating circuit patterns on the flexible substrate. In some examples, the flexible circuit 120 may be implemented by one or more of a single-sided flex circuit, a double access or back bared flex circuit, a sculpted flex circuit, a double-sided flex circuit, a multi-layer flex circuit, a rigid flex circuit, and a polymer thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multistep etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example tracking adhesive product segments 102, 104 shown in FIGS. 5A-5B, the flexible circuit 120 is a double access flex circuit that includes a front-side conductive pattern that interconnects the communication systems 72, 74, the processor 90, the one or more sensors 94, and the memory 96, and allows through-hole access (not shown) to a back-side conductive pattern that is connected to the flexible battery 116. In these examples, the front-side conductive pattern of the flexible circuit 120 connects the communications circuits 82, 86 (e.g., receivers, transmitters, and transceivers) to their respective antennas 84, 88 and to the processor 90, and also connects the processor 90 to the one or more sensors 94 and the memory 96. The backside conductive pattern connects the active electronics (e.g., the processor 90, the communications circuits 82, 86, and the sensors) on the front-side of the flexible circuit 120 to the electrodes of the flexible battery 116 via one or more through holes in the substrate of the flexible circuit 120.

Figure 6:
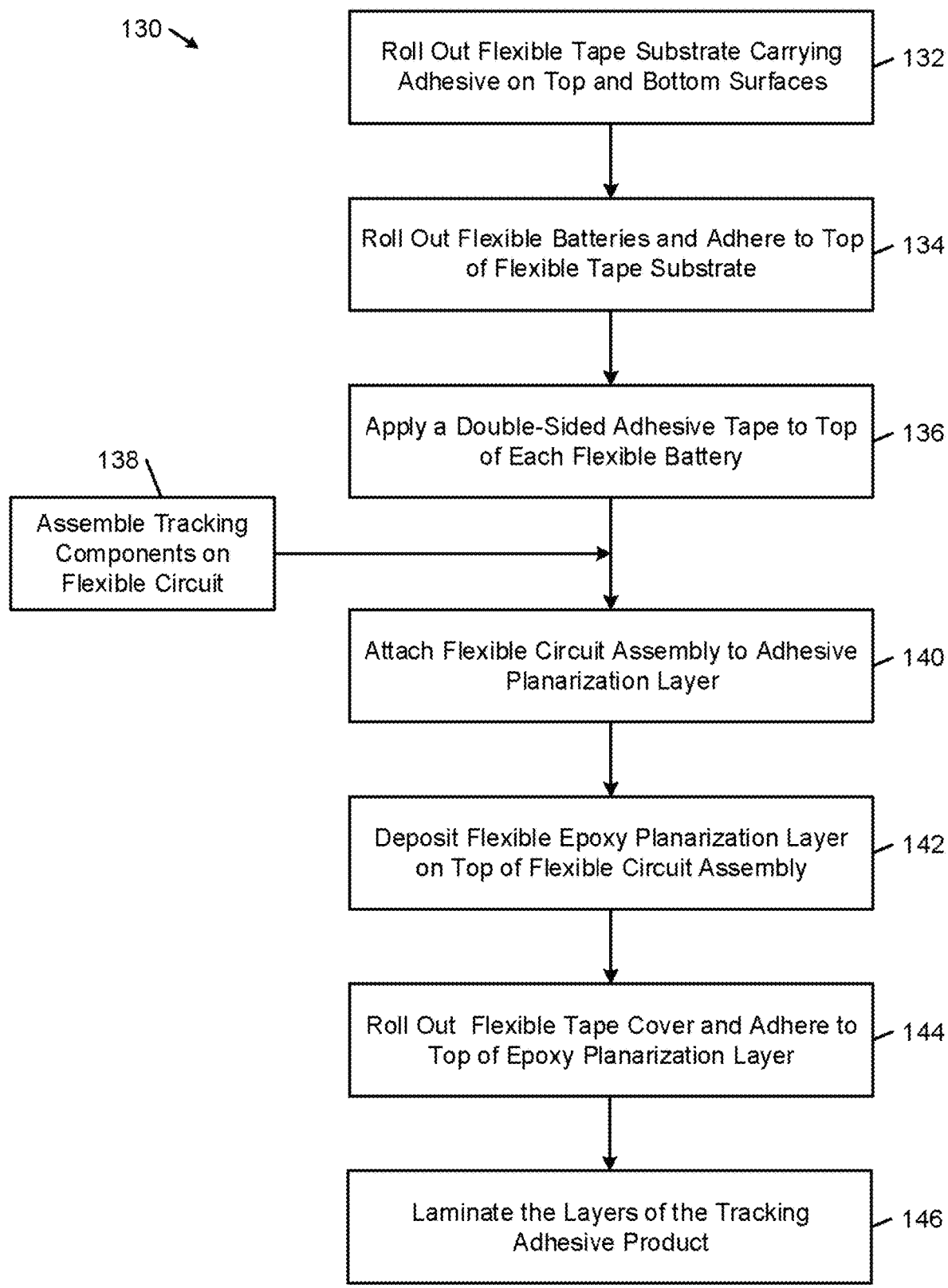
FIG. 6 is a flow diagram of an example process for fabricating a tracking adhesive product.

FIG. 6 shows an example method 130 of fabricating the adhesive product 100 (see FIGS. 5A-5B) according to a roll-to-roll fabrication process.

In accordance with the method 130, a double-sided adhesive flexible tape substrate 110 is rolled out (FIG. 6, block 132). In this example, the flexible tape substrate 110 includes respective adhesive layers 112, 114 on the top and bottom surfaces of the flexible tape substrate 110 (i.e., the flexible tape substrate 110 incorporates layers 112 and 114). In some examples, the flexible substrate 110 may be implemented by a prefabricated double-sided pressure-sensitive adhesive tape. In other examples, the adhesive layers 112, 114 are applied to the flexible substrate 110 during manufacture of the adhesive product 100 (e.g., in a process step that precedes process block 132).

Flexible batteries 116 on a tape are rolled out and adhered to the top of the flexible tape substrate 110 by the adhesive layer 112 (FIG. 6, block 134). In some examples, each flexible battery 116 is prefabricated. In some of these examples, the flexible batteries 116 are printed and/or laminated on a roll of flexible base tape. Each of the flexible batteries 116 includes one or more printed electrochemical cells, an anode, and a cathode. During assembly of the tracking adhesive product 100, individual flexible batteries 116 are separated automatically from the roll of flexible base tape and attached to the top of the flexible tape substrate 110 at spaced apart locations. In some examples, each flexible battery 116 is located in a respective segment 102, 104 of the tracking adhesive product 100.

A double-sided adhesive tape 118 is applied to the top surfaces of the flexible batteries (FIG. 6, block 136). In some other examples, instead of applying the double-sided adhesive tape 118, an adhesive planarization layer can be deposited on the top of the flexible batteries. In some of these other examples, the adhesive planarization layer creates a planar surface for the device layer across the entirety of each segment 102, 104 of the tracking adhesive product 100.

The components of the flexible circuit 120 are assembled and mounted on the flexible circuit 120 (FIG. 6, block 138). In some examples, this assembly occurs in a separate tape-based, roll-to-roll or sheet-to-sheet process in parallel with the main process flow. The resulting flexible circuit assembly is attached to the adhesive planarization layer 118 (FIG. 6, block 140). In this way, the fabrication process involves a hierarchical assembly approach in which one or more smaller tape-based modules (i.e., Systems-on-Tape), such as the flexible circuit assemblies created in block 138, are created and subsequently integrated into a larger System-on-Tape.

As explained above, in some examples, the flexible circuit 120 is a double access flex circuit that includes a front-side conductive pattern that interconnects the communication systems 72, 74, the processor 90, the one or more sensors 94, and the memory 96, and allows through-hole access to a back-side conductive pattern that is mechanically and electrically connected to the flexible battery 116. In these examples, the front-side conductive pattern of the flexible circuit 120 connects the communications circuits 82, 86 to their respective antennas 84, 88 and to the processor 90, and also connects the processor 90 to the one or more sensors 94 and the memory 96. The active electronics (e.g., the processor 90, the communications circuits 82, 86, and the sensors) on the front-side of the flexible circuit 120 are electrically connected to a backside conductive pattern of the flexible circuit 120 by means of one or more through-hole vias in the substrate of the flexible circuit 120. The backside conductive pattern defines contact pads that are mechanically and electrically coupled to the electrodes of the flexible battery 116 in order to power the active electronics on the front-side of the flexible circuit 120. In some examples, the contact pads are bonded to the flexible battery electrodes using electrically conductive ink or an electrically conductive adhesive. In other examples, the flexible battery 116 is printed on the front-side of the flexible circuit 120, in which case a single-sided flex circuit may be used instead of the double access flex circuit.

A flexible polymer planarization layer 124 is deposited on top of the flexible circuit assembly (FIG. 6, block 142). In some examples, the flexible polymer is a flexible epoxy (e.g., silicone). The flexible polymer layer 124 encapsulates the device layer 122 and thereby reduces the risk of damage that may result from the intrusion of contaminants and/or liquids (e.g., water). The flexible polymer layer 124 also planarizes the device layer 122. In some examples, the flexible polymer layer 124 planarizes the entirety of each segment 102, 104 of the adhesive product 100.

A single-sided flexible tape cover 126 is rolled out and adhered to the top of the epoxy planarization layer 124 (FIG. 6, block 144). In this example, the flexible tape cover 126 includes a pressure-sensitive adhesive layer on the backside of the flexible tape cover 126 (i.e., the flexible tape cover 126 incorporates layer 128). In some examples, the flexible tape cover 126 may be implemented by a prefabricated single-sided pressure-sensitive adhesive tape. In other examples, the adhesive layer 128 is applied to the flexible tape cover 126 during manufacture of the adhesive product 100 (e.g., in a process step that precedes process block 144).

After the flexible tape cover has been adhered to the top of the epoxy planarization layer 124, the resulting multilayer tracking adhesive product structure is laminated (FIG. 6, block 146). In some examples, the multilayer tracking adhesive product structure is annealed at a suitable annealing temperature (e.g., 120° C.). A variety of different annealing equipment may be used to anneal the multilayer tracking adhesive product structure. In some examples, the multilayer tracking adhesive product structure is annealed in a laminator.

Figure 7A:
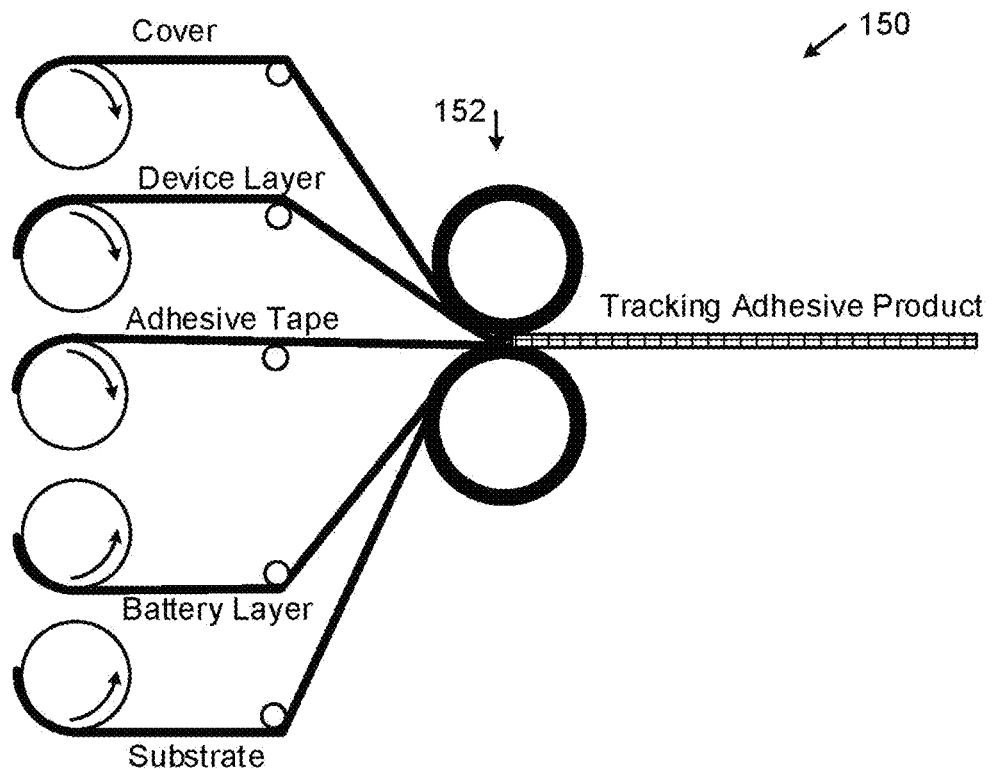
FIG. 7A is a diagrammatic side view of tracking adhesive product fabrication system.

Referring to FIG. 7A, in one example, a laminator 150 is used to anneal and laminate the component elements of the tracking adhesive product 100. In this example, the laminating rolls 152 of the laminator 150 can apply a programmed heating intensity profile over time that is designed to avoid or at least minimize degradation of heat sensitive components of the tracking adhesive product 100, such as the flexible battery 116.

Figure 7B:
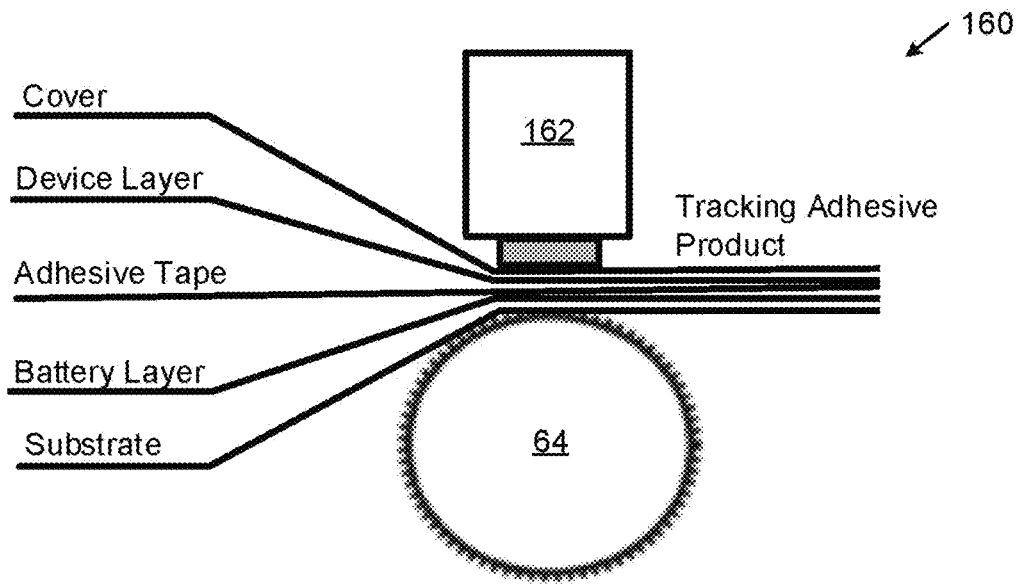
FIG. 7B is a diagrammatic side view of tracking adhesive product fabrication system.

Referring to FIG. 7B, in another example, a laminator 160 that includes an anvil 162 and an embossing roller 164 is used to anneal and laminate the multilayer tracking adhesive product structure with bonding patterns that are designed control one or more different specific properties of the tracking adhesive product. For example, the combination and pressure and an embossing pattern that is selected to increase the adhesion between the constituent layers of the adhesive tracking product 100. The bonding patterns also can be designed to increase adhesive between the layers while preserving the functionality and performance of the electronic and other components of the adhesive tracking product 100, such as the flexible battery 116 and the antennas 84, 88. For example, the constituent layers of the adhesive tracking product 100 can be embossed with an embossing pattern with a spatial frequency that is selected to minimize any deformation or other change in the structure or properties of one or more of the antennas that would result in degrading one or more performance characteristics of the antennas (e.g., gain, radiation pattern, efficiency, and impedance match).

Figure 8A:
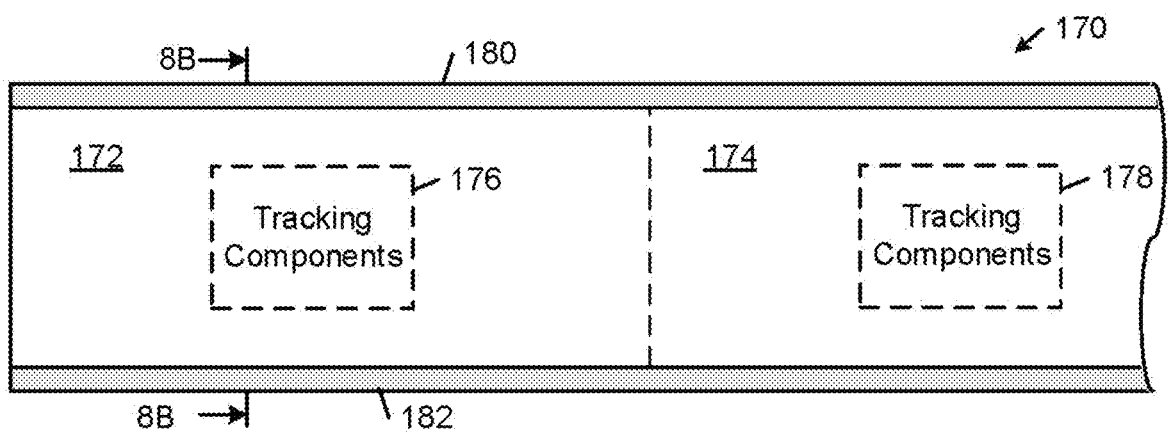
FIG. 8A is a diagrammatic top view of a length of an example tracking adhesive product.
Figure 8B:
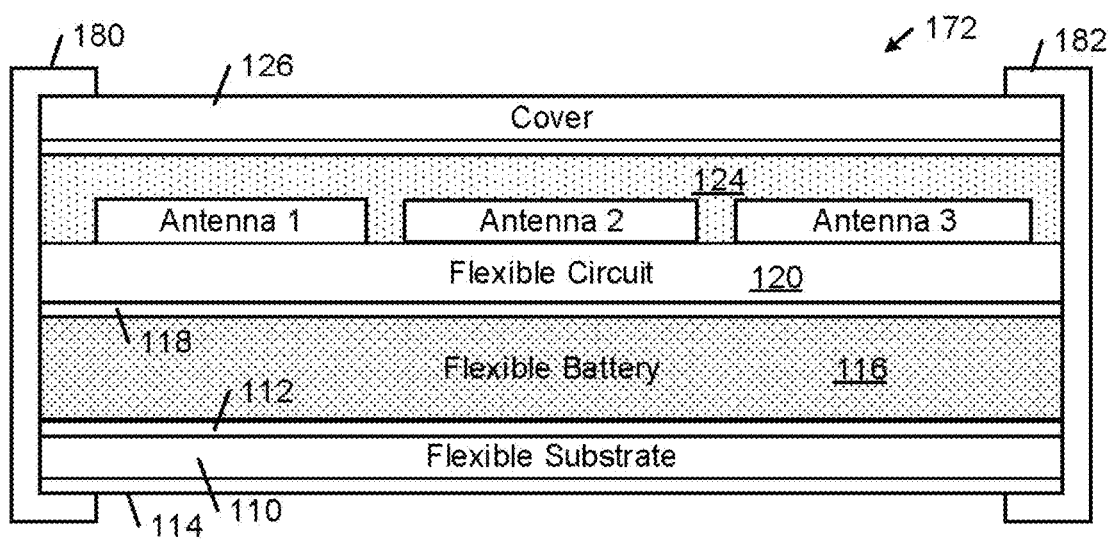
FIG. 8B is a diagrammatic cross-sectional side view of a first example implementation of the tracking adhesive product shown in FIG. 8A.

FIGS. 8A and 8B respectively show a top view and a cross-sectional side view (along the line 8B-8B in FIG. 8A) of a portion of an example tracking adhesive product 170 that includes first and second segments 172, 174 each of which includes a respective set of tracking components 176, 178. The structure and operation of tracking adhesive product 170 and its constituent components substantially corresponds to the tracking adhesive product 100 and its constituent components (see FIGS. 5A and 5B) except that the tracking adhesive product 170 additionally includes lateral ruggedization features 180, 182 that extend along the sides of the tracking adhesive product 170. In particular, each lateral ruggedization feature 180, 182 wraps around a respective longitudinal side of the tracking adhesive product 170, from the bottom adhesive layer 114 to the top surface of the cover 126. The lateral ruggedization features 180, 182 are rectangular sheets of tape that typically are formed of a polymer film, such as, polyester, polyimide, polyethylene terephthalate (PET), and/or other plastic material). In some examples, the lateral ruggedization features 180, 182 are bonded to the tracking adhesive product 170 using an adhesive, such as a pressure-sensitive adhesive or other adhesive such as a flexible epoxy (e.g., silicone). The lateral ruggedization features 180, 182 improve the ruggedness of the tracking adhesive product 170 by bonding a common flexible sheet to the exposed edges of the constituent layers on each side of the tracking adhesive product 170. In this way, the lateral ruggedization features 180, 182 provide additional structural support for holding the sheets together and reducing opportunities for the sides of the constituent layers of the tracking adhesive product 170 to fray and/or delaminate.

Figure 9:
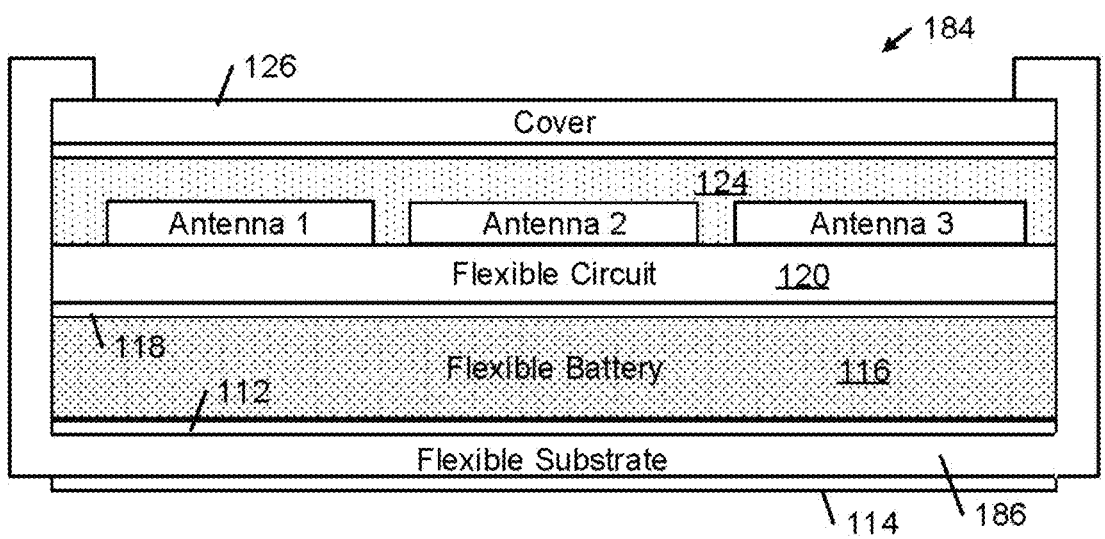
FIG. 9 is a diagrammatic cross-sectional side view of a second example implementation of the tracking adhesive product shown in FIG. 6.

FIG. 9 shows a cross-sectional side view of an alternative example of a tracking adhesive product 184 with lateral ruggedization features. In this example, the lateral ruggedization features 180, 182 of the preceding example tracking adhesive product 170 are implemented by lateral extensions of an example flexible substrate 186. In this example, the lateral sides of the flexible substrate 186 extend out laterally and wrap around the lateral sides of the tracking adhesive product 184. In some examples, the lateral extensions of the flexible substrate 186 are bonded to the tracking adhesive product 170 using an adhesive, such as a pressure-sensitive adhesive or other adhesive such as a flexible epoxy (e.g., silicone).

Figure 10:
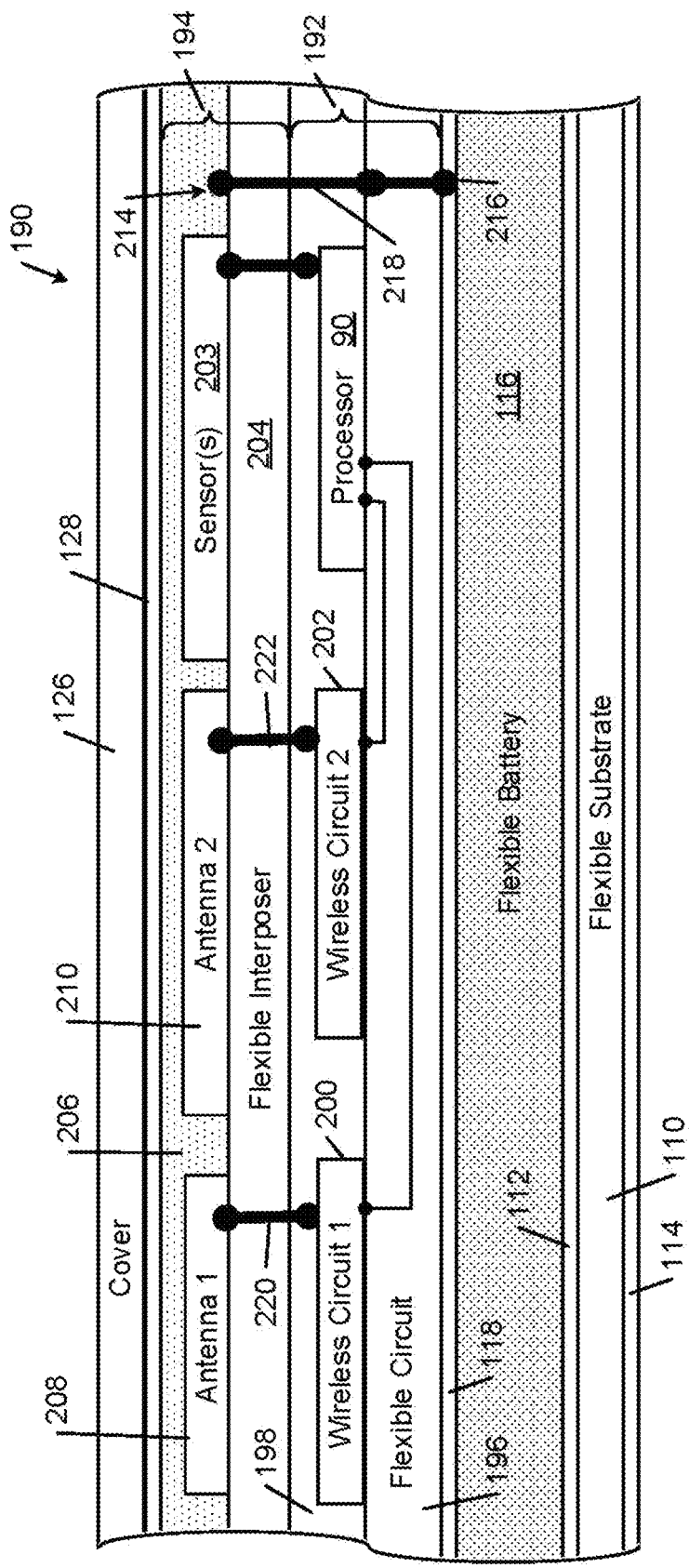
FIG. 10 is a diagrammatic cross-sectional side view of a portion of an example tracking adhesive product segment.

FIG. 10 shows a cross-sectional side view of an example of a tracking adhesive product 190 that includes a stacked arrangement of first and second interconnected device layers 192, 194. In this example, the stacked arrangement of device layers 192, 194 enables the tracking adhesive product 190 to have a tightly integrated structure that occupies a relatively small areal footprint in the tape structure and a potentially optimal layout of active components (e.g., processor 90, wireless circuits 200, 202, and sensors 203).

The first device layer 192 includes a flexible circuit 196 and a planarization layer 198, which may be a flexible epoxy (e.g., silicone). The flexible circuit 196 includes one or more wiring layers that interconnect the processor 90 and the wireless circuits 200, 202 to each other and to the flexible battery 116. In some examples, the wireless circuit 200 is a GPS receiver, and the wireless circuit 202 is a Wi-Fi transceiver 202.

The second device layer 194 includes a flexible interposer 204 and a planarization layer 206, which may be a flexible epoxy (e.g., silicone). The flexible interposer 204 includes one or more wiring layers (not shown) that connect the sensor(s) 212 to contact pads 214 on the flexible interposer 204. The contact pads 214 are connected to the electrodes of the flexible battery 116 by means of a pair of connected vias 216, 218 (i.e., "Through-Tape-Vias") that respectively extend through the flexible interposer 204, the planarization layer 198, and the flexible circuit 196. In addition, the antennas 208, 210 are connected to the respective wireless circuits 200, 202 by means of respective Through-Tape-Vias 220, 222.

In the example tracking adhesive product 190, placing the antennas 208, 210 and the sensors 203 in the top device layer 194 may improve the performance of these devices. For example, positioning the antennas 208, 210 in the top device layer 194 may improve one or more transmission and/or reception performance characteristics of the antennas 208, 210 (e.g., gain, radiation pattern, efficiency, and impedance match). Positioning the sensors 203 in the top device layer 194 also may improve their performance. For example, depending on the sensor type, one or more of the sensors 203 may require direct access or exposure to the exterior environment. Examples of these types of sensors include temperature sensors, ambient humidity sensors, ambient pressure sensors, ambient light sensors, and sound sensors. For these types of sensors, one or more openings or windows can be created in the flexible cover 126 and optionally through the pressure-sensitive adhesive layer 128 and the planarization layer 206.

In the examples shown in FIGS. 5A and 5B, the tracking components 106, 108 in each segment 102, 104 are grouped in a central portion of their respective segment 102, 104. Such a layout may be advantageous for achieving certain performance targets, such as improved electrical performance (e.g., lower parasitic resistance, capacitance, and inductance) as a result of placing components closer together. However, such improvement may conflict with other design objectives and considerations, such as improved flexibility, which can be achieved by distributing the tracking components 106, 108 in each segment 102, 104 with larger minimum spacing requirements longitudinally along the length and/or laterally along the width of each segment 102, 104 and/or avoiding a staggered placement of rigid components in different layers across the lateral and/or longitudinal dimensions of the tracking adhesive product segments 102, 104 that otherwise would reduce the flexibility of the tracking adhesive product. In addition, at least for some applications, there may be a need to reduce the number of stacked flexible substrates in the tracking adhesive product to meet flexibility, heat dissipation, or other performance targets. Therefore, in some examples, the tracking components, the sensor components, the energy source, and other components of the tracking adhesive product can be incorporated into a single device layer.

Figure 11:
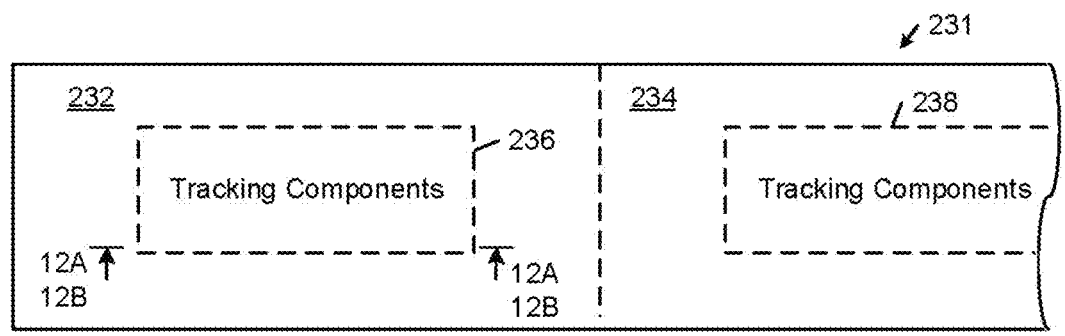
FIG. 11 is a diagrammatic top view of a length of an example tracking adhesive product.

FIG. 11 shows a top view of a portion of an example tracking adhesive product 230 that includes a first segment 232 and a portion of a second segment 234. Each segment 232, 234 of the tracking adhesive product 230 includes a respective set of tracking components 236, 238 and optionally may include a respective set of one or more sensor components. In the example tracking adhesive product 230, the tracking components 236, 238 (and optional sensor components) are distributed laterally and/or longitudinally over a larger area of the tracking adhesive product 230 in order to satisfy larger minimum spacing requirements and flexibility requirements. In addition, instead of stacking the tracking components 236 of a given segment in multiple layers, the tracking components 236, 238 (and optional sensor components) are laid out in a single device layer.

Figure 12A:
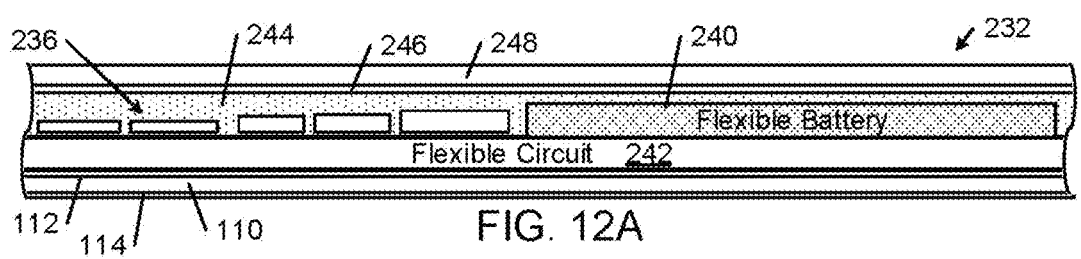
FIG. 12A is a diagrammatic cross-sectional side view of a first example implementation of the tracking adhesive product shown in FIG. 11.

FIG. 12A shows a cross-sectional side view of a portion of a segment 232 of the tracking adhesive product 231 that includes tracking components 236. The tracking adhesive product segment 232 includes a flexible substrate 110 with an adhesive layer 112 on its top surface and an optional adhesive layer 114 on its bottom surface. If the bottom adhesive layer 114 is present, a release liner (not shown) may be (weakly) adhered to the bottom surface of the adhesive layer 114. The adhesive layer 112 bonds the flexible substrate 110 to a bottom surface of a flexible circuit 242 that includes one or more wiring layers (not shown) that connect a processor, a circuit (e.g., a wireless receiver circuit, wireless transmitter circuit, or wireless transceiver circuit), an antenna, and other components (e.g., one or more sensors) in the device layer to each other and to the flexible battery 240 and, thereby, enable the tracking and other functionalities of the tracking adhesive product segment 231. A flexible polymer layer 244 encapsulates the device layer and thereby reduces the risk of damage that may result from the intrusion of contaminants and/or liquids (e.g., water). The flexible polymer layer 244 also planarizes the device, which distributes forces generated in, on or across the tracking adhesive product segment 232 so as to reduce potentially damaging asymmetric stresses that might be caused by the application of bending, torqueing, pressing, or other forces on the tracking adhesive product segment 231. A flexible cover 246 is bonded to the planarizing polymer 244 by an adhesive layer 248.

Figure 12B:
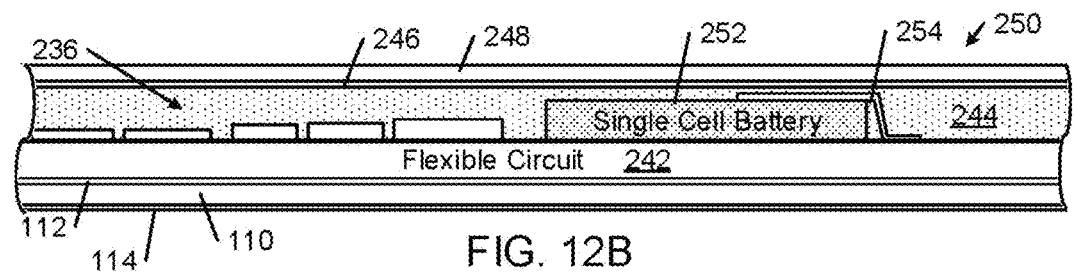
FIG. 12B is a diagrammatic cross-sectional side view of a second example implementation of the tracking adhesive product shown in FIG. 11.

FIG. 12B shows a cross-sectional side view of an alternative example 250 of the segment 232 of the tracking adhesive product 231 shown in FIG. 12A. The only difference between this alternative example 250 and the example 232 shown in FIG. 12A is that the flexible battery 240 in the example 232 has been replaced by a conventional single or multiple cell battery 252 (e.g., a watch style disk or button cell battery) and associated electrical connection apparatus 254 (e.g., a metal clip) that electrically connects the electrodes of the battery 252 to contact pads on the flexible circuit 242.

Because battery power is finite and the power needs of any particular tracking adhesive product segment generally is unknown, some examples of the tracking adhesive product segments are preconfigured in a power-off state and to remain in the power-off state until a predetermined event occurs. In some cases, the predetermined event indicates that the adhesive product segment has been deployed for use in the field. Example events include cutting a segment of a tracking adhesive product from a roll, bending a segment of a tracking adhesive product as it is being peeled off of a roll, separating a segment of a tracking adhesive product from a sheet, and detecting a change in state of the tracking adhesive product.

Figure 13A:
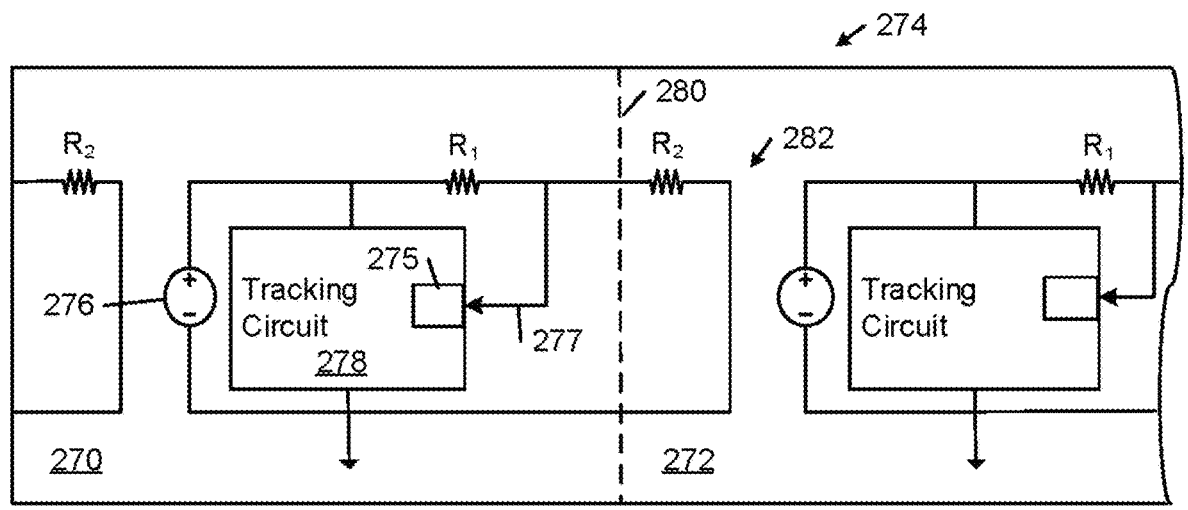
FIG. 13A is a diagrammatic top view of a length of an example tracking adhesive product.

Referring to FIG. 13A, in some examples, each of one or more of the segments 270, 272 of a tracking adhesive product 274 includes a respective circuit 275 that delivers power from the respective energy source 276 to the respective tracking circuit 278 (e.g., a processor and one or more wireless communications circuits) in response to an event. In some of these examples, the wake circuit 275 is configured to transition from an off state to an on state when the voltage on the wake node 277 exceeds a threshold level, at which point the wake circuit transitions to an on state to power-on the segment 270. In the illustrated example, this occurs when the user separates the segment from the tracking adhesive product 274, for example, by cutting across the tracking adhesive product 274 at a designated location (e.g., along a designated cut-line 280). In particular, in its initial, un-cut state, a minimal amount of current flows through the resistors $R_1$ and $R_2$. As a result, the voltage on the wake node 270 remains below the threshold turn-on level. After the user cuts across the tracking adhesive product 274 along the designated cut-line 280, the user creates an open circuit in the loop 282, which pulls the voltage of the wake node above the threshold level and turns on the wake circuit 275. As a result, the voltage across the energy source 276 will appear across the tracking circuit 278 and, thereby, turn on the segment 270. In particular embodiments, the resistance vale of resistor $R_1$ is greater than the resistance value of $R_2$. In some examples, the resistance values of resistors $R_1$ and $R_2$ are selected based on the overall design of the adhesive product system (e.g., the target wake voltage level and a target leakage current).

In some examples, each of one or more of the segments of a tracking adhesive product includes a respective sensor and a respective wake circuit that delivers power from the respective energy source to the respective one or more of the respective tracking components 278 in response to an output of the sensor. In some examples, the respective sensor is a strain sensor that produces a wake signal based on a change in strain in the respective segment. In some of these examples, the strain sensor is affixed to a tracking adhesive product and configured to detect the stretching of the tracking adhesive product segment as the segment is being peeled off a roll or a sheet of the tracking adhesive product. In some examples, the respective sensor is a capacitive sensor that produces a wake signal based on a change in capacitance in the respective segment. In some of these examples, the capacitive sensor is affixed to a tracking adhesive product and configured to detect the separation of the tracking adhesive product segment from a roll or a sheet of the tracking adhesive product. In some examples, the respective sensor is a flex sensor that produces a wake signal based on a change in curvature in the respective segment. In some of these examples, the flex sensor is affixed to a tracking adhesive product and configured to detect bending of the tracking adhesive product segment as the segment is being peeled off a roll or a sheet of the tracking adhesive product. In some examples, the respective sensor is a near field communications sensor that produces a wake signal based on a change in inductance in the respective segment.

Figure 13B:
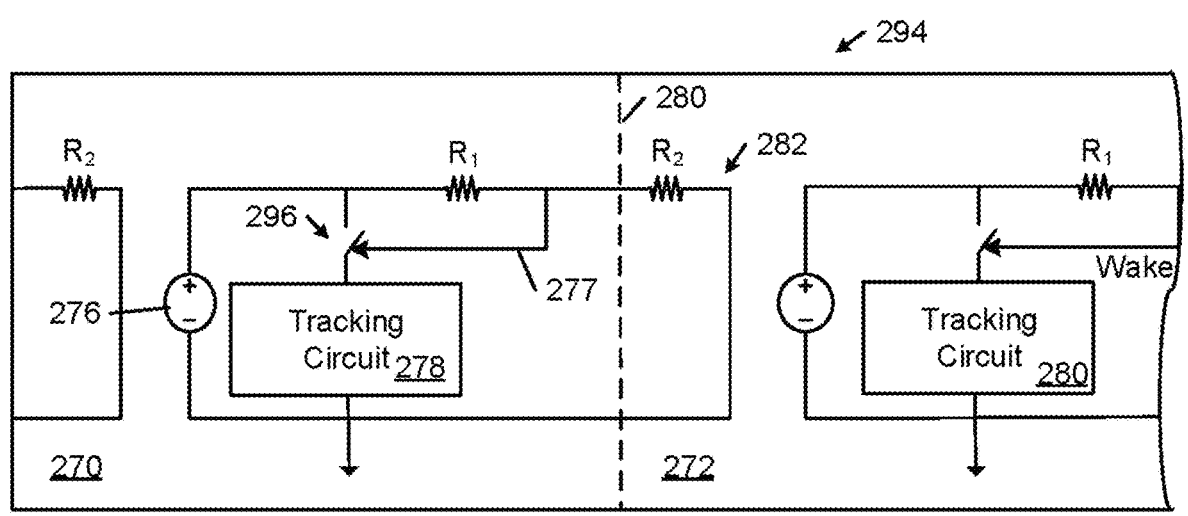
FIG. 13B shows another example of a tracking adhesive product that delivers power from the respective energy source to the respective tracking circuit in response to an event.

FIG. 13B shows another example of a tracking adhesive product 294 that delivers power from the respective energy source 276 to the respective tracking circuit 278 (e.g., a processor and one or more wireless communications circuits) in response to an event. This example is similar in structure and operation as the tracking adhesive product 294 shown in FIG. 13A, except that the wake circuit 275 is replaced by a switch 296 that is configured to transition from an open state to a closed state when the voltage on the switch node 277 exceeds a threshold level. In the initial state of the tracking adhesive product 294, the voltage on the switch node is below the threshold level as a result of the low current level flowing through the resistors $R_1$ and $R_2$. After the user cuts across the tracking adhesive product 294 along the designated cut-line 280, the user creates an open circuit in the loop 282, which pulls up the voltage on the switch node above the threshold level to close the switch 296 and turn on the tracking circuit 278.

Figure 14:
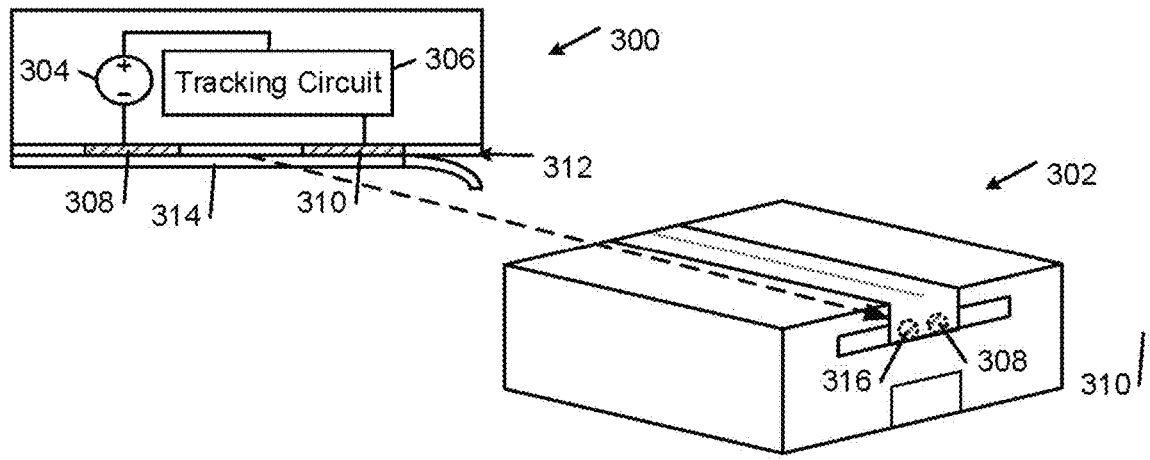
FIG. 14 is diagrammatic cross-sectional side view of an example tracking adhesive product and an example package.

FIG. 14 shows a diagrammatic cross-sectional front view of an example tracking adhesive product 300 and a perspective view of an example package 302. Instead of activating the tracking adhesive product in response to separating a segment of the tracking adhesive product from a roll or a sheet of the tracking adhesive product, this example is configured to supply power from the energy source 302 to turn on the tracking circuit 306 in response to establishing an electrical connection between two power terminals 308, 310 that are integrated into the tracking adhesive product. In particular, each segment of the tracking adhesive product 300 includes a respective set of embedded tracking components, an adhesive layer 312, and an optional backing sheet 314 with a release coating that prevents the segments from adhering strongly to the backing sheet 314. In some examples, the power terminals 308, 310 are composed of an electrically conductive material (e.g., a metal, such as copper) that may be printed or otherwise patterned and/or deposited on the backside of the tracking adhesive product 300. In operation, the tracking adhesive product can be activated by removing the backing sheet 314 and applying the exposed adhesive layer 312 to a surface that includes an electrically conductive region 316. In the illustrated embodiment, the electrically conductive region 316 is disposed on a portion of the package 302. When the adhesive backside of the tracking adhesive product 300 is adhered to the package with the exposed terminals 308, 310 aligned and in contact with the electrically conductive region 316 on the package 302, an electrical connection is created through the electrically conductive region 316 between the exposed terminals 308, 310 that completes the circuit and turns on the tracking circuit 306. In particular embodiments, the power terminals 308, 310 are electrically connected to any respective nodes of the tracking circuit 306 that would result in the activation of the tracking circuit 306 in response to the creation of an electrical connection between the power terminals 308, 310.

In some examples, after an adhesive product segment is turned on, it will communicate with the tracking service 54 to confirm that the user/operator who is associated with the adhesive product segment is an authorized user who has authenticated himself or herself to the tracking service 54. In these examples, if the adhesive product segment cannot confirm that the user/operator is an authorized user, the adhesive product segment will turn itself off.

Figure 15:
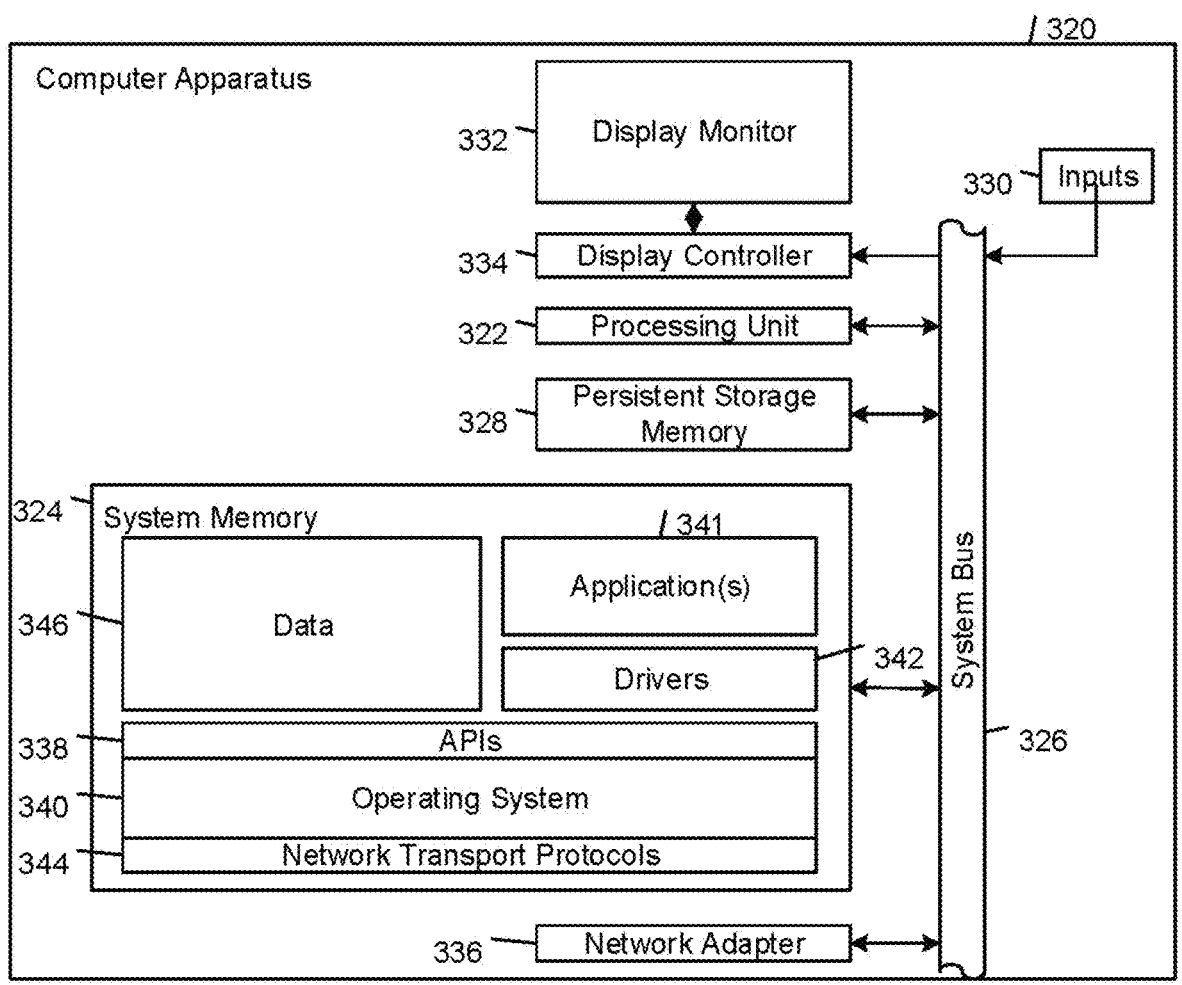
FIG. 15 is a block diagram of an example computer apparatus.

FIG. 15 shows an example embodiment of computer apparatus that, either alone or in combination with one or more other computing apparatus, is operable to implement one or more of the computer systems described in this specification, including one or more of the tracking service system 54, the network system 52, the client system 58, and the localization equipment 56.

The computer apparatus 320 includes a processing unit 322, a system memory 324, and a system bus 326 that couples the processing unit 322 to the various components of the computer apparatus 320. The processing unit 322 may include one or more data processors, each of which may be in the form of any one of various commercially available computer processors. The system memory 324 includes one or more computer-readable media that typically are associated with a software application addressing space that defines the addresses that are available to software applications. The system memory 324 may include a read only memory (ROM) that stores a basic input/output system (BIOS) that contains start-up routines for the computer apparatus 320, and a random access memory (RAM). The system bus 326 may be a memory bus, a peripheral bus or a local bus, and may be compatible with any of a variety of bus protocols, including PCI, VESA, Microchannel, ISA, and EISA. The computer apparatus 320 also includes a persistent storage memory 328 (e.g., a hard drive, a floppy drive, a CD ROM drive, magnetic tape drives, flash memory devices, and digital video disks) that is connected to the system bus 326 and contains one or more computer-readable media disks that provide non-volatile or persistent storage for data, data structures and computer-executable instructions.

A user may interact (e.g., input commands or data) with the computer apparatus 320 using one or more input devices 330 (e.g. one or more keyboards, computer mice, microphones, cameras, joysticks, physical motion sensors, and touch pads). Information may be presented through a graphical user interface (GUI) that is presented to the user on a display monitor 332, which is controlled by a display controller 334. The computer apparatus 320 also may include other input/output hardware (e.g., peripheral output devices, such as speakers and a printer). The computer apparatus 320 connects to other network nodes through a network adapter 336 (also referred to as a "network interface card" or NIC).

A number of program modules may be stored in the system memory 324, including application programming interfaces 338 (APIs), an operating system (OS) 340 (e.g., the Windows® operating system available from Microsoft Corporation of Redmond, Wash. U.S.A.), software applications 341 including one or more software applications programming the computer apparatus 320 to perform one or more of the steps, tasks, operations, or processes of the locationing and/or tracking systems described herein, drivers 342 (e.g., a GUI driver), network transport protocols 344, and data 346 (e.g., input data, output data, program data, a registry, and configuration settings).

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.

The invention claimed is:

1. A roll-to-roll method of fabricating a wireless multi-layer laminate, comprising:
at each of multiple respective locations along a first flexible layer dispensed from a first roll, forming a device layer that includes electronic components comprising an antenna, a wireless communications system, a processor, an energy source, and at least one non-transitory processor-readable medium, wherein the wireless communications system is electrically connected to the antenna, the processor is electrically connected to the at least one non-transitory processor-readable medium and the wireless communications system, and the energy source is electrically connected to the processor, the at least one non-transitory processor-readable medium, and the wireless communications system;
at each of the multiple respective locations along the first flexible layer, providing at least one sensor operable to generate ambient data characterizing an environmental state of the respective location in response to exposure to ambient stimulus;
planarizing the electronic components in the device layer, wherein the planarizing comprises layering one or more intermediate flexible layers over the device layer; and
concurrently dispensing rolls of flexible layers, wherein the dispensing comprises dispensing the first flexible layer and the one or more layered intermediate flexible layers from the first roll, and a second flexible layer from a second roll, and integrating the second flexible layer with the first flexible layer and the one or more layered intermediate flexible layers.

2. The roll-to-roll method of claim 1, wherein the planarizing comprises layering multiple of the intermediate flexible layers over the device layer.

3. The roll-to-roll method of claim 1, further comprising adhering the first flexible layer and the one or more layered intermediate flexible layers with the second flexible layer.

4. The roll-to-roll method of claim 1, wherein the layering comprises aligning one or more of the electronic components in the device layer with one or more through-holes in the one or more intermediate flexible layers.

5. The roll-to-roll method of claim 4, wherein the aligning comprises aligning one of the electronic components in the device layer with a through-hole in one or more of the one or more intermediate flexible layers.

6. The roll-to-roll method of claim 4, wherein the aligning comprises aligning the one or more of the electronic components in the device layer with a through-hole in one or more of the layered intermediate flexible layers.

7. The roll-to-roll method of claim 1, wherein the forming comprises forming the device layer on a flexible circuit that electrically connects the wireless communications system to the antenna, the processor to the wireless communications system, and the energy source to the processor and the wireless communications system.

8. The roll-to-roll method of claim 7, wherein the dispensing comprises: from a third roll, dispensing a flexible substrate concurrently with the dispensing of the first flexible layer and the second flexible layer, and integrating the flexible substrate with the first flexible layer and the second flexible layer.

9. The roll-to-roll method of claim 8, wherein the flexible substrate further comprises an adhesive layer on the bottom surface of the wireless multi-layer laminate.

10. The roll-to-roll method of claim 1, further comprising providing a battery at each of the multiple respective locations along the first flexible layer.

11. The roll-to-roll method of claim 10, wherein, at each of the multiple respective locations along the first flexible layer, the respective battery comprises a cylindrical single cell battery arranged in the device layer.

12. The roll-to-roll method of claim 1, wherein the at least one sensor comprises one or more of a GPS sensor, a capacitive sensor, a pressure sensor, a humidity sensor, a light sensor, a sound sensor, an altimeter, a gyrator, an accelerometer, a temperature sensor, a flex sensor, and a strain sensor.

13. The roll-to-roll method of claim 1, further comprising, at each of the multiple respective locations along the first flexible layer, providing a respective opening in the wireless multilayer laminate that exposes the at least one sensor to external ambient conditions.

14. The roll-to-roll method of claim 13, wherein the providing comprises providing the respective opening in a cover layer over the device layer.

15. The roll-to-roll method of claim 1, further comprising encoding the at least one non-transitory processor-readable medium with processor-readable instructions which, when executed by the processor, configures the processor to perform operations comprising processing the ambient data, storing the processed ambient data, and controlling the wireless communications system to transmit wireless messages comprising the processed ambient data to one or more network nodes.

16. The roll-to-roll method of claim 1, wherein the wireless multi-layer laminate comprises an elongate adhesive tape form factor.

17. The roll-to-roll method of claim 1, further comprising encoding the at least one non-transitory processor-readable medium with processor-readable instructions which, when executed by the processor, configures the processor to perform operations comprising controlling the wireless communications system to communicate wireless messages with one or more network nodes.

18. A roll-to-roll method of fabricating a wireless multi-layer laminate, comprising:
on a first flexible tape substrate, fabricating a device layer that includes electronic components comprising an antenna, a wireless communications system, a processor, an energy source, at least one sensor operable to generate ambient data characterizing an environmental state of a respective segment in response to exposure to ambient stimulus, and at least one non-transitory processor-readable medium on a flexible circuit that electrically interconnects the electronic components;
forming one or more planarizing intermediate film layers over the device layer;
providing a second flexible tape substrate comprising an adhesive layer on a bottom surface of the second flexible tape substrate; and
concurrently dispensing the first flexible tape substrate from a first roll and the second flexible tape substrate from a second roll, wherein the first roll comprises the fabricated device layer and the one or more planarizing intermediate film layers, wherein the dispensing comprises aligning one or more of the electronic components in the device layer with one or more through-holes in the one or more intermediate film layers, and integrating the first flexible tape substrate with the second flexible tape substrate.

19. The roll-to-roll method of claim 18, further comprising dispensing from a third roll a flexible substrate comprising a top adhesive surface and a bottom adhesive surface concurrently with the dispensing of the first flexible tape substrate from the first roll, and the second flexible tape substrate from the second roll to form a bottom surface of the wireless multi-layer laminate.

* * * * *